(12) United States Patent
Prioul et al.

(10) Patent No.: US 8,117,014 B2
(45) Date of Patent: Feb. 14, 2012

(54) METHODS TO ESTIMATE SUBSURFACE DEVIATORIC STRESS CHARACTERISTICS FROM BOREHOLE SONIC LOG ANISOTROPY DIRECTIONS AND IMAGE LOG FAILURE DIRECTIONS

(75) Inventors: Romain Prioul, Somerville, MA (US); Haitao Sun, Cambridge, MA (US); Jeroen Jocker, Arlington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 379 days.

(21) Appl. No.: 12/413,178

(22) Filed: Mar. 27, 2009

(65) Prior Publication Data

US 2010/0250214 A1 Sep. 30, 2010

(51) Int. Cl.
G06F 17/50 (2006.01)
G06F 3/00 (2006.01)
(52) U.S. Cl. ............ 703/2; 703/10; 702/7; 702/14; 367/31; 367/86
(58) Field of Classification Search ............... 703/2, 10; 702/7, 14; 367/31, 86
See application file for complete search history.

(56) References Cited

U.S. PATENT DOCUMENTS

| | | | |
|---|---|---|---|
| 4,831,600 A | 5/1989 | Hornby et al. | |
| 4,870,627 A | 9/1989 | Hsu et al. | |
| 5,214,613 A | 5/1993 | Esmersoy | |
| 5,243,521 A | 9/1993 | Luthi | |
| 5,398,215 A * | 3/1995 | Sinha et al. ............ | 367/31 |
| 5,808,963 A | 9/1998 | Esmersoy | |
| 5,838,633 A * | 11/1998 | Sinha ............ | 367/31 |
| 5,889,729 A | 3/1999 | Frenkel et al. | |
| 6,308,137 B1 | 10/2001 | Underhill et al. | |
| 6,351,991 B1 | 3/2002 | Sinha | |
| 6,714,480 B2 | 3/2004 | Sinha et al. | |
| 6,714,873 B2 * | 3/2004 | Bakulin et al. ............ | 702/14 |
| 6,718,266 B1 | 4/2004 | Sinha et al. | |
| 7,042,802 B2 * | 5/2006 | Sinha ............ | 367/86 |
| 7,388,380 B2 | 6/2008 | Chen et al. | |
| 7,457,194 B2 | 11/2008 | Prioul et al. | |
| 2003/0125878 A1* | 7/2003 | Bakulin et al. ............ | 702/14 |
| 2005/0065730 A1* | 3/2005 | Sinha ............ | 702/7 |
| 2007/0140055 A1 | 6/2007 | Tello et al. | |
| 2007/0143020 A1 | 6/2007 | Bradford et al. | |

(Continued)

OTHER PUBLICATIONS

Cornet, Francois H., "The HTPF and the Integrated Stress Determination Methods," Comprehensive Rock Engineering, 1993, pp. 413-432, vol. 3, Chp. 15, Hudson, Oxford: Pergamon Press.

(Continued)

*Primary Examiner* — Thai Phan

(57) ABSTRACT

Methods and apparatus for estimating stress characteristics of formations. The method comprises: (a) acquiring sonic anisotropy data, image data or both associated with at least one borehole (b) employing sonic anisotropy data to estimate fast shear direction (FSA) to extract FSA observed data; (c) computing FSA from forward modeling, forward modeling utilizes a first deviatoric stress tensor to extract FSA predicted data; (d) computing FSA misfit from difference between FSA observed data and FSA predicted data to obtain computed FSA misfit relating to first deviatoric stress tensor; (e) if computed FSA misfit is equal to or less than a defined value, then store computed FSA misfit, otherwise repeat steps (d)-(h) using another deviatoric stress tensor so a different deviatoric stress tensor is used for each repeat; (f) selecting smallest stored computed misfit from group consisting of stored computed FSA misfit, at least one other stored computed misfit or combination thereof.

53 Claims, 7 Drawing Sheets

U.S. PATENT DOCUMENTS

| | | | |
|---|---|---|---|
| 2008/0062814 A1* | 3/2008 | Prioul et al. | 367/31 |
| 2008/0178668 A1* | 7/2008 | Yan et al. | 73/152.02 |
| 2008/0319675 A1 | 12/2008 | Sayers | |
| 2009/0070042 A1 | 3/2009 | Birchwood et al. | |

OTHER PUBLICATIONS

Hornby, B.E. et al.,"Fracture evaluation using reflected Stoneley-wave arrivals," Geophysics, Oct. 1989, pp. 1274-1288, vol. 54, No. 10.

Tezuka, Kazuhiko et al.,"Modeling of low-frequency Stoneley wave propagation in an irregular borehole," Geophysics, 1977, pp. 24-27.

Qian, Wei and Pedersen, Laust B., "Inversion of Borehole Breakout Orientation Data," Journal of Geophysical Research, Nov. 10, 1991, pp. 20,093-20,107, vol. 96, No. 12.

Qian, W. et al., "Correction to Inversion of borehole breakout orientation data," Journal of Geophysical Research, Jan. 10, 1994, pp. 707-710, vol. 99, No. B1.

Mastin, Larry, "Effect of Borehole Deviation on Breakout Orientations," Journal of Geophysical Research, Aug. 10, 1988, pp. 9187-9195, vol. 93, No. B8.

Sayers, C.M. and Kachanov, M. "A Simple Technique for Finding Effective Elastic Constants of Cracked Solids for Arbitrary Crack Orientation Statistics," International Journal of Solids and Structures, 1991, pp. 671-680, vol. 27, No. 6, Great Britain.

Sayers, C.M., "Microcrack-induced elastic wave anisotropy of brittle rocks," Journal of Geophysical Research, Mar. 10, 1995, pp. 4149-4156, vol. 100, No. B3.

Schoenberg, Michael and Sayers, Colin M., "Seismic anisotropy of fractured rock," Geophysics, Jan.-Feb. 1995, pp. 204-211, vol. 60, No. 1.

Sayers, Colin M., "Sensitivity of elastic-wave velocities to stress changes in sandstones," The Leading Edge, Dec. 2005, pp. 1262-1266.

Sayers, Colin M., "Sensitivity of time-lapse seismic to reservoir stress path," Geophysical Prospecting, 2006, pp. 369-380.

Prioul, Romain et al., "Nonlinear rock physics model for estimation of 3D subsurface stress in anisotropic formations: Theory and laboratory verification," Geophysics, Mar.-Apr. 2004, pp. 415-425, vol. 69, No. 2.

Sinha, Bikash K. et al, "Borehole flexural modes in anisotropic formations," Geophysics, Jul. 1994, pp. 1037-1052, vol. 59, No. 7.

Hudson, J.A. et al., "ISRM Suggested Methods for rock stress estimation—Part 1: Strategy for rock stress estimation," International Journal of Rock Mechanics and Mining Sciences, 2003, pp. 991-998, vol. 40, Elsevier Ltd.

Sjoberg, J. et al., "ISRM Suggested Methods for rock stress estimation—Part 2: overcoming methods," International Journal of Rock Mechanics and Mining Sciences, 2003, pp. 999-1010, vol. 40, Elsevier Ltd.

Haimson, B.C. and Cornet, F.H., "ISRM Suggested Methods for rock stress estimation—Part 3: hydraulic fracturing (HF) and/or hydraulic testing of pre-existing fractures (HTPF)," International Journal of Rock Mechanics and Mining Sciences, 2003, pp. 1011-1020, vol. 40, Elsevier Ltd.

Christiansson, R. and Hudson, J.A., "ISRM Suggested Methods for rock stress estimation—Part 4: Quality control of rock stress estimation," International Journal of Rock Mechanics and Mining Sciences, 2003, pp. 1021-1025, vol. 40, Elsevier Ltd.

Fairhurst, C., "Stress estimation in rock: a brief history and review" International Journal of Rock Mechanics and Mining Sciences, 2003, pp. 957-973, vol. 40, Elsevier Ltd.

Gephart, John W. and Forsyth, Donald W, "An Improved Method for Determining the Regional Stress Tensor Using Earthquake Focal Mechanism Data: Application to the San Fernando Earthquake Sequence," Journal of Geophysical Research, Oct. 10, 1084, pp. 9305-9320, vol. 89, No. B11.

Esmersoy, C. et al., "Fracture and Stress Evaluation Using Dipole-Shear Anisotropy Logs," SPWLA 36th Annual Logging Symposium, Jun. 26-29, 1995, pp. 1-12.

Zoback, Mark D. et al., "Well Bore Breakouts and in Situ Stress," Journal of Geophysical Research, Jun. 10, 1985, pp. 5523-5530, vol. 90, No. B7.

Vernik, Lev and Zoback, Mark D.,"Estimation of Maximum Horizontal Principal Stress Magnitude From Stress-Induced Well Bore Breakouts in the Cajon Pass Scientific Research Borehole," Journal of Geophysical Research, Apr. 10, 1992, pp. 5109-5119, vol. 97, No. B4.

Sinha, Bikash K. et al., "Radial profiling of three formation shear moduli," SEG Annual Meeting, 2005, pp. 364-368, Houston, Texas USA.

Alford, R.M., "Shear Data in the Presence of Azimuthal Anisotropy: Dilley, Texas," SEG Annual Meeting, 1986, pp. 476-479.

Esmersoy, C. et al., "Dipole shear anisotropy logging," SEG Annual Meeting, 1994, pp. 1139-1142.

Tang, Xiaoming and Chunduru, Raghu K., "Simultaneous inversion of formation shear-wave anisotropy parameters from cross-dipole acoustic-array waveform data," Geophysics, Sep.-Oct. 1999, pp. 1502-1511, vol. 64, No. 5.

Norris, Andrew N. and Sinha, Bikash K., "Weak elastic anisotropy and the tube wave," Geophysics, Aug. 1993, pp. 1091-1098, vol. 58, No. 8.

Sinha, Bikash K. and Kostek, Sergio, "Stress-induced azimuthal anisotropy in borehole flexural waves," Geophysics, Nov.-Dec. 1996, pp. 1899-1907, vol. 61, No. 6.

Winkler, Kenneth W. et al., "Effects of borehole stress concentrations on dipole anisotropy measurements," Geophysics, Jan.-Feb. 1998, pp. 11-17, vol. 63, No. 1.

Sinha, Bikash K. et al., "Dipole dispersion crossover and sonic logs in a limestone reservoir," Geophysics, Mar.-Apr. 2000, pp. 390-407, vol. 65, No. 2.

Donald, A. and Bratton, T., "Advancements in Acoustic Techniques for Evaluating Open Natural Fractures," SPWLA 47th Annual Logging Symposium, Jun. 4-7, 2006, pp. 1-10.

Prioul, Romain et al., "Forward modeling of fracture-induced sonic anisotropy using a combination of borehole image and sonic logs," Geophysics, Jul.-Aug. 2007, pp. E135-E147, vol. 72, No. 4.

Plenefisch, T. and Bonjer, K.P. "The stress field in the Rhine Graben area inferred from earthquake focal mechanisms and estimation of frictional parameters," Tectonophysics, 1997, pp. 71-97, 275, Elsevier.

Lanin, Anatoly and Fedik, Ivan, "Evolution of Theoretical Concepts of Thermal Stress Resistance," Thermal Stress Resistance of Materials, Jan. 2008, p. 5, Chapter 2, Springer, [pdf online, retrieved on May 18, 2010 from the internet www.springer.com/cda/content/document/.../9783540713999-c1.pdf?...].

Schlumberger, "BorStress Specifications & Development Plan Document," 2001, pp. 1-35.

Schlumberger, "GeoFrame 4.2, BorStress User's Guide," Nov. 2004, pp. 1-41.

Cesaro, M et al., "Shaping up to stress in the Apennines," 2000, pp. 64-73.

* cited by examiner

METHODS TO ESTIMATE SUBSURFACE DEVIATORIC STRESS CHARACTERISTICS FROM BOREHOLE SONIC LOG ANISOTROPY DIRECTIONS AND IMAGE LOG FAILURE DIRECTIONS

CROSS-REFERENCE TO RELATED APPLICATIONS

This patent application is related to the following commonly-assigned U.S. Patent Applications which hereby are incorporated by reference in their entirety:
  i) U.S. patent application Ser. No. 11/553,565, now issued as U.S. Pat. No. 7,457,194 and entitled "DISCRIMINATING NATURAL FRACTURE-AND STRESS-INDUCED SONIC ANISOTROPY USING A COMBINATION OF IMAGE AND SONIC LOGS";
  ii) U.S. patent application Ser. No. 09/871,856, now issued as U.S. Pat. No. 6,308,137 and entitled "WHILE-DRILLING APPARATUS FOR MEASURING STREAMING POTENTIALS AND DETERMINING EARTH FORMATION CHARACTERISTICS";
  iii) U.S. patent application Ser. No. 09/514,866, now issued as U.S. Pat. No. 7,243,718 entitled "METHOD AND APPARATUS FOR COMMUNICATION WITH A DOWNHOLE TOOL";
  iv) U.S. Provisional Patent Application No. 60/000,000 entitled "METHOD AND SYSTEM TO DETERMINE THE GEO-STRESSES REGINE FACTOR Q FROM BOREHOLE SONIC MEASUREMENT MODELING", filed on Aug. 27, 2008.

BACKGROUND OF THE INVENTION

1. Field of the Invention

The present invention generally relates to the fields of borehole geology, geomechanics and geophysics. In particular, the identification and evaluation of depth zones having subsurface deviatoric stress characteristics, i.e. the principal stress directions and stress ellipsoid shape factor R, using borehole sonic anisotropy directions in one or multiple deviated boreholes, either independently or in combination with other data.

2. Background of the Invention

Known methods and devices for extracting oil and natural gas from subterranean formations include drilling boreholes into hydrocarbon-bearing zones, building a well completion, and then recovering the product. Various sensors are utilized in order to enhance both the creation of the borehole and the productivity of the completed well. For example, wireline and logging-while-drilling sonic tools are utilized to measure the dynamic elastic properties of the formation around the borehole using compressional and shear velocity measurements. When the elastic properties of the formation are anisotropic, several velocities can be measured and used to partially or totally characterize the anisotropic elastic tensor, depending on the propagation and polarization direction. Various conditions can cause anisotropy, including but not limited to intrinsic rock properties, fractures, and non-equal principal stresses. The latter condition has some implications for wellbore stability, optimal hydraulic-fracturing, completion design, and other geophysical and petrophysical applications.

Further, having a good knowledge of existing stressed state data in a formation can be required information for planning drilling operations and mine construction. In those situations, poor estimates of effective stresses may lead to additional costs and safety problems related to geological hazards and instability of borehole or mine. Furthermore, the development of many existing oil fields and orientation of fractures are typically controlled by direction of maximum horizontal stress. Therefore, stress characterization performed prior to production may reduce risk in reservoir management decisions, particularly for production in areas.

Definition of Rock Stress

The importance of rock stress is well known for most subsurface rock activities such as in mining and oil extraction, which rely on knowledge and application of rock mechanics. The stress at a point within a rock mass is a tensor quantity that has three normal stress components acting perpendicular to the faces of a small cube, and six shear stress components acting along the faces [Hudson, J. A., F. H. Cornet, R. Christiansson, ISRM Suggested Methods for rock stress estimation Part 1: Strategy for rock stress estimation, International Journal of Rock Mechanics & Mining Sciences 40 (2003) 991998]. From moment conservation and equilibrium conditions, the nine component stress tensor has six independent components. The stress state, $\sigma$, is specified either by: (a) the three normal stresses and the three shear stresses acting on the three specified orthogonal planes determined by a set of x, y, and z-axes; or (b) the directions (defined for example by the Euler's angles) and magnitudes (for instance $\sigma_1 > \sigma_2 > \sigma_3$) of the three principal stresses. Alternatively, the magnitudes of the stress tensor can be represented by the combination of the following three parameters: (i) R, the deviatoric shape factor (also called "ellipsoid" shape factor) of the stress tensor, $R = (\sigma_2 - \sigma_3)/(\sigma_1 - \sigma_3)$, (ii) the ratio $\sigma_3/\sigma_1$, and (iii) the magnitude of $\sigma_1$. The relative deviatoric component of the stress tensor can then be written as a tensor, $\sigma_d$ with the same principal directions as $\sigma$ and magnitudes equal to (1, R, 0).

Overview of Existing Methods for Rock Stress Estimation

Techniques to estimate subsurface rock stress have been studied extensively by the rock mechanics scientific community. For a recent review of the existing methods, refer to a series of articles entitled: "ISRM Suggested Methods for rock stress estimation" [Hudson, J. A., F. H. Cornet, R. Christiansson, ISRM Suggested Methods for rock stress estimation Part 1: Strategy for rock stress estimation, International Journal of Rock Mechanics & Mining Sciences 40 (2003) 991998; Sjoberg, J., R. Christiansson, J. A. Hudson, ISRM Suggested Methods for rock stress estimation Part 2: overcoring methods, International Journal of Rock Mechanics & Mining Sciences 40 (2003) 9991010; Haimson, B. C., F. H. Cornet, ISRM Suggested Methods for rock stress estimation Part 3: hydraulic fracturing (HF) and/or hydraulic testing of pre-existing fractures (HTPF), International Journal of Rock Mechanics & Mining Sciences 40 (2003) 10111020; R. Christiansson, J. A. Hudson, ISRM Suggested Methods for rock stress estimation Part 4: Quality control of rock stress estimation, International Journal of Rock Mechanics & Mining Sciences 40 (2003) 10211025; C. Fairhurst, Stress estimation in rock: a brief history and review, International Journal of Rock Mechanics & Mining Sciences 40 (2003) 957973] or to a recent book titled "Reservoir Geomechanics" [M. D. Zoback, Reservoir Geomechanics (2007), Cambridge University Press].

Stress is a three-dimensional quantity by nature and potentially varies spatially in all earth coordinate directions (North, East, vertical or predefined Cartesian x, y and z axes). For a complete stress tensor determination, the magnitudes and directions of the three principal stresses have to be estimated at each point in the subsurface. Most methods proceed along the following steps, for example:

(1) First step, may consider whether the vertical direction is a principal stress direction (from topography, geological evidence and other information);
(2) Second step, estimate the vertical stress component magnitude (from the rock density and overburden depth);
(3) Third step, consider indications of the principal stress directions and the ratio of stress differences from surface observations (e.g. earthquakes focal plane solutions inversion or seismic shear wave anisotropy);
(4) Fourth step, establish the minimum principal stress orientation using subsurface observations such as failure observations on borehole images (hydraulic fractures, drilling induced fractures or borehole breakout orientations) or borehole sonic anisotropy directions;
(5) Fifth step, establish the complete stress state at one or more locations from one or several of the following steps:
  (5a) from hydraulic fracturing tests in boreholes by establishing the minimum principal stress and maximum principal stress magnitude (hydraulic fracturing tests, borehole failure analysis or borehole sonic anisotropy);
  (5b) using indirect methods on borehole core (such as the Kaiser effect and differential strain analysis);
  (5c) from overcoring tests;
  (5d) by hydraulic testing in boreholes of pre-existing fractures (HTPF); and
(6) Sixth step, finally establish the variation of the stress state across the site due to different geological strata and fractures (as estimated through numerical analyses and further measurements).

In summarizing the previous steps, the first task is most always to determine the principal directions (steps 1 to 4), and the second task is likely to determine partial or full measure of the magnitudes (steps 5 and 6), i.e. any of the possible R, $\sigma_1$, $\sigma_2$, $\sigma_3$, and $\sigma_3/\sigma_1$. The ellipsoid shape factor of the stress tensor, $R=(\sigma_2-\sigma_3)/(\sigma_1-\sigma_3)$ is an important quantity that can sometimes be estimated more easily from absolute stress magnitudes.

Overview of Step 1 Above

When step 1 indicates that the vertical direction is not a principal stress direction (due to topography, complex geological strata, fractures to cite a few examples), most known methods used to find the principal stress directions would no longer apply. For example, two main classes of methods have tried to overcome this problem include: (1) the first class yields indications of the principal stress directions from earthquakes focal plane solutions inversion [Gephart, J. & Forsyth, D., 1984, a method for determining the regional stress tensor using earthquake focal mechanism data: application to the San Fernando earthquake sequence, J. Geophys. Res., 89 (2), 2177-2180]. Wherein, the solutions from the above noted methods usually suppose a large volume in which the stress is homogeneous, and the validity of such solutions can still be debated; (2) the second class uses hydraulic testing of pre-existing fractures (HTPF) in boreholes. Thus, the second class obviously is not applicable if there are no preexisting fractures in the borehole [Cornet F H. The HTPF and the integrated stress determination methods, in: Hudson, editor; comprehensive rock engineering, vol. 3 Oxford: Pergamon Press; 1993; pp 413-32 (chapter 15)].

Overview of Step 2 Above

Regarding step 2 above, when the vertical direction is a principal stress direction, the vertical magnitude can be estimated provided one or several boreholes exist, and the measurement of rock bulk density can be performed using standard nuclear logging tools from the surface to the depth of interest (and then integrated over depth). This step is one of the most easily achievable, one small limitation being practical as density logs are rarely recorded up to the surface (missing data are generally extrapolated).

Overview of Step 3 Above

Regarding step 3 above, a major limitation from earthquakes focal plane solutions inversion or seismic shear wave anisotropy solutions can be coming from the fact that the data are not consistently available, especially on oilfield basins. As mentioned above, another limitation from earthquakes focal plane inversion is that the validity of the method is still debated. Seismic shear wave anisotropy suffers from the ambiguity in the interpretation of the cause of the anisotropy as being fractured-induced, intrinsic-induced or stress-induced [U.S. Pat. No. 6,714,873 B2]. At most, such methods provide indications on stress field directions but rarely yield reliable results on R (the ratio of stress differences).

Overview of Step 4 Above

Regarding step 4 above, borehole images logs have been successful at estimating the direction of the minimum or maximum horizontal principal stress from failure observations such as drilling induced fractures, borehole breakout orientations or hydraulic fractures [Luthi, S. M., 2000, Geological well logs: their use in reservoir modeling: Springer; M. D. Zoback, Reservoir Geomechanics (2007), Cambridge University Press]. Limitations include the fact that stress related failures are not always observed in a borehole (i.e. no data), and that the interpretation of stress-related failure can be misinterpreted because of the presence of natural fractures or borehole damages (i.e. false positives or negatives). Borehole sonic anisotropy techniques have been developed using dipole shear anisotropy to estimate the maximum horizontal stress direction, $\sigma_H$ [Esmersoy, C., Kane, M., Boyd, A., and Denoo, S., 1995, Fracture and stress evaluation using dipole shear anisotropy logs: in $36^{th}$ Annu. Logging Symp. Trans., SPWLA, 1-12]. One major limitation is that the cause of the observed sonic anisotropy needs to be identified as being stress-related and not fracture-induced or intrinsic-induced. Overall both image and sonic log techniques for stress direction estimation have been developed for vertical boreholes, but these techniques do not apply when boreholes are deviated more than several degrees.

Overview of Steps 5 and 6 Above

Regarding steps 5 and 6 above, one of the most frequently applied and reliable techniques to estimate the minimum (horizontal) principal stress is using hydraulic fracturing tests in boreholes. However, the magnitude of the maximum (horizontal) principal stress is more difficult to estimate. Several techniques have been developed: Using borehole breakouts identified on borehole images [Zoback M. D., Moos D., Mastin L. & Anderson R. N. (1985), Well bore breakouts and in situ stress, Journal of geophysical research, 90, B7, 5523-5530; Vernik L. & Zoback M. D. (1992), Estimation of the maximum horizontal principal stress magnitude from stress-induced well bore breakouts in the Cajon Pass scientific research borehole, Journal of Geophysical Research, 97, B4, 5109-5119], or using borehole sonic anisotropy [Sinha, B., Method for estimating formation in-situ stress magnitudes using a sonic borehole tool, U.S. Pat. No. 5,838,633 (1998); Sinha, B., Determining stress parameters of formations from multi-mode velocity data, U.S. Pat. No. 6,351,991 (2002); Sinha, B., Determination of stress characteristics of earth formations, U.S. Pat. No. 7,042,802 B2 (2006)]. Breakout techniques suffer from the lack of knowledge of failure properties. Sonic anisotropy suffers from the difficulty to identify stress-related sonic anisotropy, the presence of stress-sensitive rock formations and the requirement of the knowledge of two principal stress magnitudes and the pore pressure. Also, sonic methods are not applicable in non-vertical wells in their present form.

Overview of Identifying Causes of Anisotropy Regarding Steps 3-6 Above

As noted in Steps 3-6 above, it is important for having reliable methods for identifying the cause of the anisotropy to obtain indications on stress field directions, e.g., reliable results on R (the ratio of stress differences). For example, there are known techniques for identifying the anisotropy, such as using monopole P- and S-waves, monopole Stoneley and cross-dipole shear sonic data in the anisotropic formation to estimate one compressional and three shear moduli [Sinha, B., et al., Radial profiling of three formation shear moduli, 75th Ann. Internat. Mtg. Soc. of Expl. Geophys., 2005; U.S. Pat. No. 6,714,480, entitled "Determination of anisotropic moduli of earth formations", to Sinha, B., et al., issued Mar. 30, 2004, incorporated by reference herein in their entireties.] An orthorhombic formation with a vertical symmetry axis is characterized by three shear moduli: $c_{44}$, $c_{55}$ and $c_{66}$. In a vertical borehole, two vertical shear moduli ($c_{44}$ and $c_{55}$) can be directly estimated from azimuthal anisotropy analysis of cross-dipole waveforms. Fast-shear azimuth can be calculated using a method such as Alford rotation, and fast- and slow-shear slownesses can be estimated from the zero-frequency limits of cross-dipole dispersions [Alford, R. M., Shear data in the presence of azimuthal anisotropy, 56th Ann. Internat. Mtg., Soc. of Expl. Geophys. 1986; Esmersoy, C., et al., Dipole shear anisotropy logging, $64^{th}$ Ann. Internat. Mtg, Soc. of Expl. Geophys., 1994; Sinha, B., et al., Radial profiling of three formation shear moduli, 75th Ann. Internat. Mtg. Soc. of Expl. Geophys., 2004; U.S. Pat. No. 5,214,613, entitled "Method and Apparatus for Determining Properties of Anisotropic Elastic Media" to Esmersoy, C., issued May 25, 1993; U.S. Pat. No. 5,808,963, entitled "Dipole Shear Anisotropy Logging", to Esmersoy, C., issued Sep. 15, 1998, or for an alternative method see U.S. Pat. No. 6,718,266, entitled "Determination of dipole shear anisotropy of earth formations" to Sinha, B., et al., issued Apr. 6, 2004; Tang, X., et al, Simultaneous inversion of formation shear-wave anisotropy parameters from cross-dipole acoustic-array waveform data, Geophysics, 1999, incorporated by reference herein in their entireties]. The third shear modulus, $c_{66}$, can be estimated from the Stoneley data, provided corrections are applied to remove any near-wellbore alteration and tool effects [Norris, A. N., et al., Weak elastic anisotropy and the tube wave, Geophysics, 1993, 58, 1091-1098; U.S. Pat. No. 6,714,480, entitled "Determination of anisotropic moduli of earth formations" to Sinha, B., et al., issued Mar. 30, 2004, incorporated by reference herein in their entireties]. Dipole dispersion curves are then used to identify the cause of the anisotropy of the elastic properties: (i) stress-induced effects (due to far field non equal principal stresses and near field stress concentration around the borehole) using the characteristic crossover of the dipole curves [Sinha, B. K., et al., Stress-induced azimuthal anisotropy in borehole flexural waves, Geophysics, 1996; Winkler, K. W., et al., Effects of borehole stress concentrations on dipole anisotropy measurements, Geophysics, 1998; Sinha, B. K., et al., Dipole dispersion crossover and sonic logs in a limestone reservoir, Geophysics, 2000; U.S. Pat. No. 5,398,215, entitled "Identification of Stress Induced Anisotropy in Formations" to Sinha, B., issued Mar. 14, 1995, incorporated by reference herein in their entireties], or (ii) intrinsic- or fracture-induced anisotropy using the characteristics of parallel dispersion curves [Sinha, B. K., et al., Borehole flexural modes in anisotropic formations, Geophysics, 1994; U.S. Pat. No. 5,398,215 entitled, "Identification of Stress Induced Anisotropy in Formations" to Sinha, B., issued Mar. 14, 1995, incorporated by reference herein in their entireties]. However when both fracture and stress effects are present, or when the analysis of dispersion curves is difficult to interpret due to attenuation of high frequencies [Donald, A. et al., Advancements in acoustic techniques for evaluating natural fractures, 47th Annu. Logging Symp., SPWLA, 2006, incorporated by reference herein in its entirety.], or when the symmetry axis of the anisotropic medium and the borehole axis are not aligned, the interpretation of the observed anisotropy becomes more challenging. Independent information has to be provided to confirm the observations and discriminate the relative importance of the different effects [Prioul, R., A., Donald, R., Koepsell, Z. El Marzouki, T., Bratton, 2007, Forward modeling of fracture-induced sonic anisotropy using a combination of borehole image and sonic logs, Geophysics, Vol. 72, pp. E135-E147].

Furthermore, discriminating the relative importance of the different effects can be especially important when the principal stress directions and the normal to the natural fracture planes are not aligned. The analysis of the Stoneley mode reflections and attenuation allows the identification of open fractures in the borehole, and an estimation of their apertures [U.S. Pat. No. 4,870,627, entitled "Method and apparatus for detecting and evaluating borehole wall to Hsu, K., issued Sep. 26, 1989; Hornby, B. E., et al., Fracture evaluation using reflected Stoneley-wave arrivals, Geophysics; 1989; Tezuka, K., et al., Modeling of low-frequency Stoneley-wave propagation in an irregular borehole, Geophysics, 1997; U.S. Pat. No. 4,831,600, entitled, "Borehole Logging Method for Fracture Detection and Evaluation" to Hornby, B., issued May 16, 1989, incorporated by reference herein in their entireties.] In addition, the interpretation of borehole images (electrical and ultrasonic) can be used to identify either open or closed fractures [Luthi, S. M., Geological well logs: their use in reservoir modeling, Springer, 2000; U.S. Pat. No. 5,243,521, entitled, "Width determination of fractures intersecting a borehole" to Luthi, S., issued Sep. 7, 1993, incorporated by reference herein in their entireties.] It is noted fracture properties such as location and orientation can then be calculated.

A Method for Estimating Stress Directions and R from Borehole Failure (I.E. Breakouts or Tensile Fractures) in Multiple Deviated Wells and Limitations A method using breakout or tensile fracture orientations at the borehole wall from several deviated boreholes has been developed to extract the maximum horizontal stress direction, $\sigma_H$, and shape factor of the stress tensor, R. [Cesaro, M., M., Gonfalini, P., Cheung, A. Etchecopar (2000), Shaping up to stress in the Apennines, Schlumberger Well Evaluation Conference, Italy 2000; Etchecopar A., et al., BorStress document and user manual, Schlumberger report, 2001] or, an alternative similar approach: [Qian, W., Pedersen, L. B. (1991), Inversion of borehole breakout orientation data, Journal of Geophysical Research, 96, B12, 20093-20107; Qian, W., Crossing, K. S., Pedersen, L. B., Dentith, M. C., List, R. D. (1994), Correct to "Inversion of borehole breakout orientation data", Journal of Geophysical Research, 99, B1, 707-710]. Part of the method is based on work from Mastin L. (1988), Effect of borehole deviation on breakout orientations, Journal of Geophysical Research, 93, B8, 9187-9195. There are some advantages of using the above-mentioned method, which include: (1) it relies only on the orientation of the breakouts or tensile fractures and not on any failure criteria and failure properties. These criteria are difficult to estimate and can vary between several wells so not having to determine them is an important benefit of this method; (2) it is not restricted to vertical wells, and is valid using combinations of vertical and non-vertical wells or only non-verticals wells. At least two wells with different orientations are required or a single well with different well trajectory orientations in the volume of interest; and (3) from knowledge of R plus the magnitudes of vertical and minimum horizontal stresses, it is possible to estimate the maximum horizontal stress magnitude. However, there are many limitations to using the above-mentioned method, such as: (1) this method is not applicable if there is no borehole image or no breakout observed (no data); (2) no other data (e.g. sonic anisotropy) can be used in this method in its present form; (3) the vertical direction is assumed to be a principal direction; (4) at least two wells with different well orientations are required; and (5) when combining data from several wells, the hypothesis of homogeneous stress field in terms of its directions and shape factor has to be satisfied for a given volume.

Another Method for Estimating Stress Directions Estimation of the Stress Ellipsoid Shape Factor R Using Anisotropic Elastic Moduli from Sonic Anisotropy Shear Slowness Data This method discloses an estimation of the stress ellipsoid shape factor R using anisotropic elastic moduli from sonic anisotropy shear slowness data [V. Pistre, Y. GongRui; B. Sinha, R. Prioul, Method and algorithm to determine the geo-stresses regime factor Q from borehole sonic measurement, U.S. Provisional Patent Application No. 60.000000]. However, even though this method discloses using a single borehole, the method is limited to conditions where the borehole axis and one of the principal stresses are substantially aligned (mainly in the vertical direction). Further, this method also requires the knowledge of sonic shear slowness data. In fact, this method cannot estimate principal stress directions and the stress ellipsoid shape factor R using borehole sonic anisotropy directions in one or multiple deviated boreholes, either independently or in combination with borehole failure directions (e.g. breakouts or tensile fractures) from image log data. In addition, nor can this method consider the case, when the borehole axis and the principal stresses are not aligned.

Therefore, there is a need for methods and devises that overcome the above noted limitations of the prior art. By non-limiting example, methods that can estimate subsurface principal stress directions and ellipsoid shape factor R from borehole sonic log anisotropy directions and image log failure directions, e.g., to determine subsurface deviatoric stress characteristics.

SUMMARY OF THE INVENTION

According to embodiments of the invention, the invention relates to the determination of the subsurface principal stress characteristics, i.e. deviatoric stress tensor characteristics (i.e. the principal stress directions and stress ellipsoid shape factor R), using borehole sonic anisotropy directions in one or multiple deviated boreholes, either independently or in combination with borehole failure directions (e.g. breakouts) from image log data.

According to at least one embodiment of the invention, the invention includes a method for estimating stress characteristics of formations, the method comprises the steps of: (a) acquiring one of sonic anisotropy data, image data or both associated with one or more borehole wherein the one or more borehole is one of vertical or deviated; (b) employing the sonic anisotropy data to estimate fast shear direction (FSA) so as to extract FSA observed data; (c) computing the FSA from forward modeling, wherein the forward modeling utilizes a first deviatoric stress tensor to extract FSA predicted data; (d) computing FSA misfit from the difference between the FSA observed data and the FSA predicted data to obtain a computed FSA misfit that relates to the first deviatoric stress tensor; (e) if the computed FSA misfit is equal to or less than a defined value, then store the computed FSA misfit, repeat steps (d) thru (h) using another deviatoric stress tensor such that a different deviatoric stress tensor is used for each repeat, until one of all or multiple predefined deviatoric stress tensors have been applied in step (c); and (f) selecting the smallest stored computed misfit from the group consisting of the stored computed FSA misfit, one or more other stored computed misfit or some combination thereof, to determine a final estimated deviatoric stress tensor whereby the final estimated deviatoric stress tensor is used for reservoir activities.

According to aspects of the invention, the invention may include the further step of storing with the computed FSA misfit of step (e), the first deviatoric stress tensor. The invention may include the further step of after repeating steps (c) thru (e), storing the computed FSA misfit of step (e) along with storing the respective deviatoric stress tensor. Further, the invention may include the aspect of the further step of storing with the final estimated deviatoric stress of step (f), the respective deviatoric stress tensor. Further, the deviatoric stress tensor may include principal stress directions and deviatoric stress factor R. Further still, the one or more other stored computed misfit can be one of a computed borehole break direction (BOD) misfit, a computed tensile fracture direction (TFD) misfit, or both.

According to aspects of the invention, the invention may include the computed BOD misfit and the computed TFD misfit be calculated by the steps of: (a) employing the image data to identify borehole failure type and orientation, wherein the image data includes one of the BOD, the TFD or both so as to extract one of a BOD observed data, a TFD observed data, or both; (b) computing one of the BOD, the TFD or both from forward modeling, wherein the forward modeling utilizes the first deviatoric stress tensor to extract one of a BOD predicted data, a TFD predicted data or both; (c) computing the BOD misfit from the difference between the BOD observed data and the BOD predicted data to obtain a computed BOD misfit which relates to the first deviatoric stress tensor; (d) if the computed BOD misfit is equal to or less than a second defined value, then store the computed BOD misfit and the first deviatoric stress tensor, repeat steps (b) thru (c) using another deviatoric stress tensor such that a different deviatoric stress tensor is used for each repeat, until one or more predefined deviatoric stress tensors have been applied in step (b), then after repeating steps (b) thru (d), storing the computed BOD misfit of step (d) along with storing the respective deviatoric stress tensor; (e) computing TFD misfit from the difference between the TFD observed data and the TFD predicted data to obtain the computed TFD misfit which relates to the first deviatoric stress tensor; and (f) if the computed TFD misfit is equal to or less than a third defined value, then store the computed TFD misfit and the first deviatoric stress tensor, repeat steps (d) thru (e) using another deviatoric stress tensor such that a different deviatoric stress tensor is used for each repeat, until one of all or multiple predefined deviatoric stress tensors have been applied in step (b), then after repeating steps (b), (f) thru (g), storing the computed FSA misfit of step (g) along with storing the respective deviatoric stress tensor. Further, the invention may include the aspect of further including in step (b) replacing the forward modeling that utilizes first deviatoric stress tensor with: (1) having a given deviatoric stress tensor in a principal stress frame (PSF), such that the given deviatoric stress tensor is transformed into a north-east vertical frame (NEV); (2) transforming the given deviatoric stress tensor from the NEV frame to a top of the borehole frame (TOH) using previously stored borehole orientation data; and (3) using analytical expressions for stresses at one or more borehole wall for an arbitrary orientation of the borehole (Kirsch-Fairhurst Stress Model), relative to a far-field in situ stress tensor provides computing a direction of BOD for any one of the one or more borehole orientation as an angle for which a tangential stress reaches a maximum value, whereby the TFD is provided by an angle for which the tangential stress reaches a minimum value. Further still, it is possible further including in step (3) replacing the Kirsch-Fairhurst Stress Model with at least one other stress model that provides for stresses at the borehole wall for an arbitrary orientation of the borehole relative to the far-field stress.

According to aspects of the invention, the invention may include the FSA being combined with one of BOD, TFD, or some combination thereof, so as to be combined into a single grid search algorithm. It is possible, the invention may include in step (c) replacing the forward modeling utilizing first deviatoric stress tensor with: (1) having a given deviatoric stress tensor in a principal stress frame (PSF); (2) computing an effective stiffness tensor (Cijkl) as a function of stress using a stress-induced stiffness model provides for an effective stiffness tensor (Cijkl) in the PSF frame; (3) rotating the effective stiffness tensor (Cijkl) in the PSF frame in a north-east vertical frame (NEV) in combination with: (3A) incorporating results from an elastic wave propagation theory; and (3B) incorporating P- and S-wave velocities and polarization directions derived from an arbitrary wave propagation; and (4) computing the FSA from a polarization direction of a fastest shear wave. Further still, including in step (2) replacing the stress-induced stiffness model with at least one other stress-induced stiffness rock physics model. Further, replacing steps (2) and (3) with a different stress-induced stiffness model and a propagation theory having at least one other model.

According to aspects of the invention, the invention may include sonic anisotropy data that includes borehole sonic logs. Further, the image data may include one of borehole ultrasonic logs, resistivity image logs, borehole ultrasonic logs and resistivity image logs, or some combination thereof. Further still, the FSA data can be combined with one of BOD, TFD or some combination thereof, so as to be combined into a single grid search algorithm. It is possible the forward modeling can be based on a mechanical model. Further, including in step (b) the employing of the sonic anisotropy data to estimate fast shear direction (FSA) may be performed in stress-sensitive rock formations. It is also possible the deviatoric stress tensor can be further defined by stress directions and stresses regime factor Q. Further, the failure may further be defined from the group consisting of: a borehole breakout, a borehole tensile fracture, a tensile fracture, a borehole drilling induced fracture, a drilling induced fracture, a borehole hydraulic fracture, a hydraulic fracture, a borehole shear fracture or a shear fracture.

According to aspects of the invention, the invention may include further including in step (b): (i) calculating a predicted modeled FSA data from forward modeling, wherein the forward modeling includes a group consisting of one of a forward modeling of fracture-induced anisotropy, forward modeling of layer-induced anisotropy, forward modeling of stress-induced anisotropy or any combination thereof; (ii) comparing the calculated predicted modeled FSA data with the extracted observed FSA data to obtain an modeled FSA error that identifies extracted observed FSA data having stress-induced anisotropy origin; and (iii) if the modeled FSA error is equal to or less than a defined value, then store the modeled FSA error which identifies extracted observed FSA data having stress-induced anisotropy origin then go to step (c), otherwise repeat steps (i) thru (ii) and if no extracted observed FSA data having stress-induced anisotropy origin is identified, then go to step (a).

According to aspects of the invention, the invention may include the forward modeling of fracture-induced anisotropy to include a fracture-induced anisotropy model and one of inputs of natural fracture dip, inputs of drilling induced fracture dip, an another fracture data or any combination thereof. Further, the forward modeling of layer-induced anisotropy can include a layer-induced anisotropy model and one of inputs of bedding dip, an another geological layering data or any combination thereof. Further still, the forward modeling of stress-induced anisotropy may include a stress-induced anisotropy model and one of inputs of drilling induced fracture dip, inputs of breakout-direction, inputs of stress directions data or any combination thereof.

According to at least one embodiment of the invention, the invention includes an apparatus for estimating stress characteristics of formations. The apparatus comprises of: a memory operable to store image data and a sonic anisotropy data associated with one or more borehole wherein the one or more borehole is one of vertical or deviated; circuitry operable to employ the sonic anisotropy data to estimate fast shear direction (FSA) so as to extract FSA observed data; circuitry operable to employ computing the FSA from forward modeling, wherein the forward modeling utilizes a first deviatoric stress tensor to extract FSA predicted data; circuitry operable to employ computing FSA misfit from the difference between the FSA observed data and the FSA predicted data to obtain a computed FSA misfit that relates to the first deviatoric stress tensor; circuitry operable to determine if the computed FSA misfit is equal to or less than a defined value, then stores the computed FSA misfit and the first deviatoric stress tensor in the memory, repeat computing FSA misfit using another deviatoric stress tensor such that a different deviatoric stress tensor is used for each repeat, until one of all or multiple predefined deviatoric stress tensors have been applied while computing the FSA from forward modeling, then store the repeated computed FSA misfit along with storing the respective deviatoric stress tensor; and circuitry operable to selecting the smallest stored computed misfit from the group consisting of the stored computed FSA misfit and their respective deviatoric stress tensor, one or more other stored computed misfit and their respective deviatoric stress tensor or some combination thereof, to determine a final estimated deviatoric stress tensor whereby the final estimated deviatoric stress tensor is used for reservoir activities.

According to aspects of the invention, the invention may include the first deviatoric stress tensor including principal stress directions and deviatoric stress factor R. Further, the one or more other stored computed misfit can be one of computed borehole break direction (BOD) misfit or computed tensile fracture direction (TFD) misfit. Further still, the circuitry can be operable for computing BOD misfit and TFD misfit by: (a) circuitry operable for employing the image data to identify borehole failure type and orientation, wherein the image data includes one of BOD, TFD or both so as to extract one of BOD observed data, TFD observed data, or both; (b) computing one of the BOD, TFD or both from forward modeling, wherein the forward modeling utilizes the first deviatoric stress tensor to extract one of BOD predicted data, TFD predicted data or both; (c) computing BOD misfit from the difference between the BOD observed data and the BOD predicted data to obtain the computed BOD misfit which relates to the first deviatoric stress tensor; (d) circuitry operable to determine if the computed BOD misfit is equal to or less than a second defined value, then store the computed BOD misfit and the first deviatoric stress tensor, repeat computing BOD misfit using another deviatoric stress tensor such that a different deviatoric stress tensor is used for each repeat, until one of all or multiple predefined deviatoric stress tensors have been applied while computing the BOD from forward modeling, then store the repeated computed BOD misfit along with storing the respective deviatoric stress tensor; (e) computing TFD misfit from the difference between the TFD observed data and the TFD predicted data to obtain the computed TFD misfit which relates to the first deviatoric stress tensor; and (f) if the computed TFD misfit is equal to or less than a third defined value, then store the computed TFD misfit and the first deviatoric stress tensor, repeat computing TFD misfit using another deviatoric stress tensor such that a different deviatoric stress tensor is used for each repeat, until one of all or multiple predefined deviatoric stress tensors have been applied while computing the FSA from forward modeling, then store the repeated computed FSA misfit along with storing the respective deviatoric stress tensor. It is possible the apparatus may further include replacing the first deviatoric stress tensor with: (1) having a given deviatoric stress tensor in a principal stress frame (PSF), such that the given deviatoric stress tensor is transformed into a north-east vertical frame (NEV); (2) transforming the given deviatoric stress tensor from the NEV frame to a top of the borehole frame (TOH) using previously stored borehole orientation data; and (3) using analytical expressions for stresses at one or more borehole wall for an arbitrary orientation of the borehole (Kirsch-Fairhurst Stress Model), relative to a far-field in situ stress tensor provides computing a direction of BOD for any one of the one or more borehole orientation as an angle for which a tangential stress reaches a maximum value, whereby the TFD is provided by an angle for which the tangential stress reaches a minimum value. Further still, replacing the Kirsch-Fairhurst Stress Model with: at least one other stress model that provides for stresses at the borehole wall for an arbitrary orientation of the borehole relative to the far-field stress. Further, replacing the first deviatoric stress tensor with: (1) having a given deviatoric stress tensor in a principal stress frame (PSF); (2) computing an effective stiffness tensor (Cijkl) as a function of stress using a stress-induced stiffness model provides for an effective stiffness tensor (Cijkl) in the PSF frame; (3) rotating the effective stiffness tensor (Cijkl) in the PSF frame in a north-east vertical frame (NEV) in combination with: (3(A)) incorporating results from an elastic wave propagation theory; and (3(B)) incorporating P- and S-wave velocities and polarization directions derived from an arbitrary wave propagation; and (4) computing the FSA from a polarization direction of a fastest shear wave. Further, replacing the stress-induced stiffness model with a stress-induced stiffness rock physics model. It may also be possible that the sonic anisotropy data include borehole sonic logs. Further, image data can include one of borehole ultrasonic logs, resistivity image logs, borehole ultrasonic logs and resistivity image logs, or some combination thereof.

According to at least one embodiment of the invention, the invention includes a method for estimating deviatoric stress tensor from borehole sonic log shear anisotropy directions and image log failure directions, the method comprising the steps of: (a) acquiring one of sonic anisotropy data, image data or both associated with one or more borehole wherein the one or more borehole is one of vertical or deviated; (b) employing the sonic anisotropy data to estimate fast shear direction (FSA) so as to extract FSA observed data; (c) computing the FSA from forward modeling, wherein the forward modeling utilizes a first deviatoric stress tensor to extract FSA predicted data, such that the first deviatoric stress tensor comprises of one or more deviatoric stress tensor; (d) computing FSA misfit from the difference between the FSA observed data and the FSA predicted data to obtain a computed FSA misfit which relates to the first deviatoric stress tensor; (d (1)) if the computed FSA misfit is equal to or less than a first defined value, then store the computed FSA misfit and the first deviatoric stress tensor, repeat steps (c) thru (d (1)) using another deviatoric stress tensor such that a different deviatoric stress tensor is used for each repeat, until one or more predefined deviatoric stress tensors have been applied in step (c), then after repeating steps (c) thru (d(1)), storing the computed FSA misfit of step (d(1)) along with storing the respective deviatoric stress tensor; (e) optionally employing the image data to identify borehole failure type and orientation, wherein the image data includes one of borehole break direction (BOD), tensile fracture direction (TFD) or both so as to extract one of BOD observed data, TFD observed data, or both; (e (1)) computing one of the BOD, TFD or both from forward modeling, wherein the forward modeling utilizes the first deviatoric stress tensor to extract one of BOD predicted data, TFD predicted data or both; (e (1)(a)) computing BOD misfit from the difference between the BOD observed data and the BOD predicted data to obtain a computed BOD misfit which relates to the first deviatoric stress tensor; (e (1)(a)(i)) if the computed BOD misfit is equal to or less than a second defined value, then store the computed BOD misfit and the first deviatoric stress tensor, repeat steps (e (1)(a)) thru (e (1)(a)(i)) using another deviatoric stress tensor such that a different deviatoric stress tensor is used for each repeat, until one of all or multiple predefined deviatoric stress tensors have been applied while computing the BOD from forward modeling, then store the repeated computed BOD misfit along with storing the respective deviatoric stress tensor; (e (1)(b)) computing TFD misfit from the difference between the TFD observed data and the TFD predicted data to obtain a computed TFD misfit which relates to the first deviatoric stress tensor; (e (1)(b)(i)) if the computed TFD misfit is equal to or less than a third defined value, then store the computed TFD misfit and the first deviatoric stress tensor, repeat steps (e (1)(b)) thru (e (1)(b)(i)) using another deviatoric stress tensor such that a different deviatoric stress tensor is used for each repeat, until one of all or multiple predefined deviatoric stress tensors have been applied while computing the TFD from forward modeling, then store the repeated computed TFD misfit along with storing the respective deviatoric stress tensor; (f) selecting the smallest stored computed misfit along with the respective deviatoric stress tensor from the group consisting of one of the computed FSA misfit, computed BOD misfit, computed TFD misfit or any combination thereof, so as to select a final estimated deviatoric stress tensor whereby the final estimated deviatoric stress tensor is used for reservoir activities.

According to aspects of the invention, the invention may include the deviatoric stress tensor including principal stress directions and deviatoric stress shape factor R. Further, replacing the first deviatoric stress tensor with: (1) having a given deviatoric stress tensor in a principal stress frame (PSF), such that the given deviatoric stress tensor is transformed into a north-east vertical frame (NEV); (2) transforming the given deviatoric stress tensor from the NEV frame to a top of the borehole frame (TOH) using previously stored borehole orientation data; and (3) using analytical expressions for stresses at one or more borehole wall for an arbitrary orientation of the borehole (Kirsch-Fairhurst Stress Model), relative to a far-field in situ stress tensor provides computing a direction of BOD for any one of the one or more borehole orientation as an angle for which a tangential stress reaches a maximum value, whereby the TFD is provided by an angle for which the tangential stress reaches a minimum value. Further still, replacing the Kirsch-Fairhurst Stress Model with at least one other stress model that provides for stresses at the borehole wall for an arbitrary orientation of the borehole relative to the far-field stress.

According to aspects of the invention, the invention may include replacing the first deviatoric stress tensor with: (1) having a given deviatoric stress tensor in a principal stress frame (PSF); (2) computing an effective stiffness tensor (Cijkl) as a function of stress using a stress-induced stiffness model provides for an effective stiffness tensor (Cijkl) in the PSF frame; (3) rotating the effective stiffness tensor (Cijkl) in the PSF frame in a north-east vertical frame (NEV) in combination with: (3(A)) incorporating results from an elastic wave propagation theory; and (3(B)) incorporating P- and S-wave velocities and polarization directions derived from an arbitrary wave propagation; and (4) computing the FSA from a polarization direction of a fastest shear wave. Further, replacing the stress-induced stiffness model with a stress-induced stiffness rock physics model. It is also possible sonic anisotropy data includes borehole sonic logs. Further still, image data can include one of borehole ultrasonic logs, resistivity image logs, borehole ultrasonic logs and resistivity image logs, or some combination thereof. Further, the FSA data can be combined with one of BOD, TFD or some combination thereof, so as to be combined into a single grid search algorithm. It is possible the forward modeling can be based on a mechanical model. Further, the employing of the sonic anisotropy data to estimate fast shear direction (FSA) can be performed in stress-sensitive rock formations. Further, the deviatoric stress tensor can be further defined by stress direction and stresses regime factor Q. It is also possible the failure can be further defined from the group consisting of: a borehole breakout, a borehole tensile fracture, a tensile fracture, a borehole drilling induced fracture, a drilling induced fracture, a borehole hydraulic fracture, a hydraulic fracture, a borehole shear fracture or a shear fracture.

According to at least one embodiment of the invention, the invention includes a method for estimating stress characteristics of formations, the method comprises the steps of: (a) acquiring one of sonic anisotropy data, image data or both associated with one or more borehole wherein the one or more borehole is one of vertical or deviated; (b) employing the sonic anisotropy data to estimate fast shear direction (FSA) so as to extract FSA observed data; (c) computing the FSA from forward modeling, wherein the forward modeling utilizes a first deviatoric stress tensor to extract FSA predicted data; (d) computing FSA misfit from the difference between the FSA observed data and the FSA predicted data to obtain a computed FSA misfit that relates to the first deviatoric stress tensor; (e) if the computed FSA misfit is equal to or less than a defined value, then store the computed FSA misfit, otherwise repeat steps (d) thru (h) using another deviatoric stress tensor such that a different deviatoric stress tensor is used for each repeat, until one of all or multiple predefined deviatoric stress tensors have been applied in step (c); and (f) selecting the smallest stored computed misfit from the group consisting of the stored computed FSA misfit, one or more other stored computed misfit or some combination thereof, to determine a final estimated deviatoric stress tensor whereby the final estimated deviatoric stress tensor is used for reservoir activities.

According to aspects of the invention, the invention may include the further step of storing with the computed FSA misfit of step (e), the first deviatoric stress tensor. The invention may include the further step of after repeating steps (c) thru (e), storing the computed FSA misfit of step (e) along with storing the respective deviatoric stress tensor. Further, the invention may include the aspect of the further step of storing with the final estimated deviatoric stress of step (f), the respective deviatoric stress tensor. Further, the deviatoric stress tensor may include principal stress directions and deviatoric stress factor R. Further still, the one or more other stored computed misfit can be one of a computed borehole break direction (BOD) misfit, a computed tensile fracture direction (TFD) misfit, or both.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

According to embodiments of the invention, the invention estimates deviatoric stress tensor characteristics (i.e. principal stress directions and the stress ellipsoid shape factor R) using borehole sonic anisotropy directions in one or multiple deviated boreholes, either independently or in combination with borehole failure directions (e.g. breakouts or tensile fractures) from image log data.

Sonic anisotropy directions can be considered equivalent to the dipole sonic fast-shear azimuth, also referred to as FSA. Further, borehole breakout directions are referred as BOD and tensile fractures directions are referred as TFD.

Figure 1:
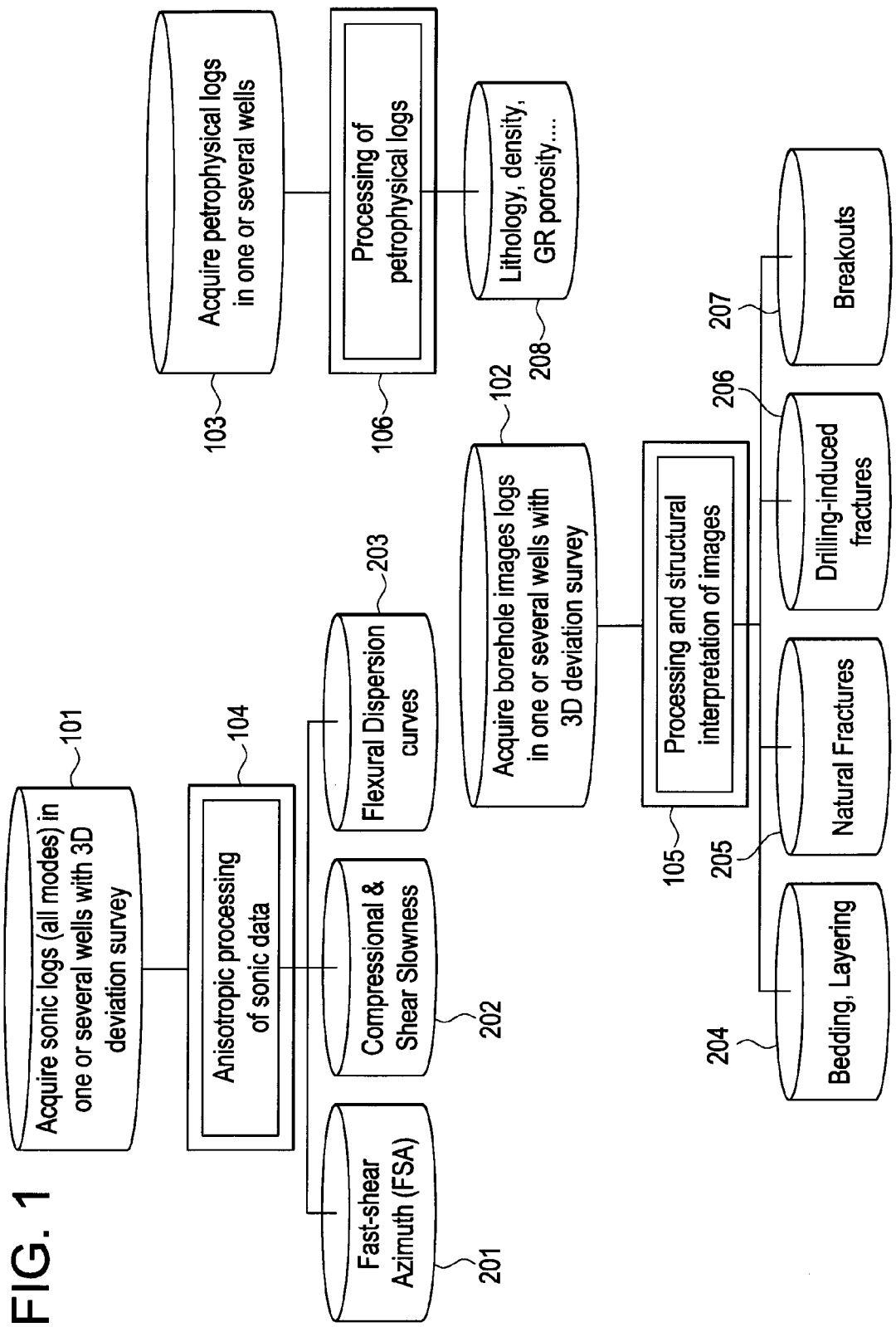
FIG. 1 illustrates Step 1 of at least one workflow diagram of data acquisition and processing of borehole image, sonic and petrophysical logs, according to embodiments of the invention.
Figure 2:
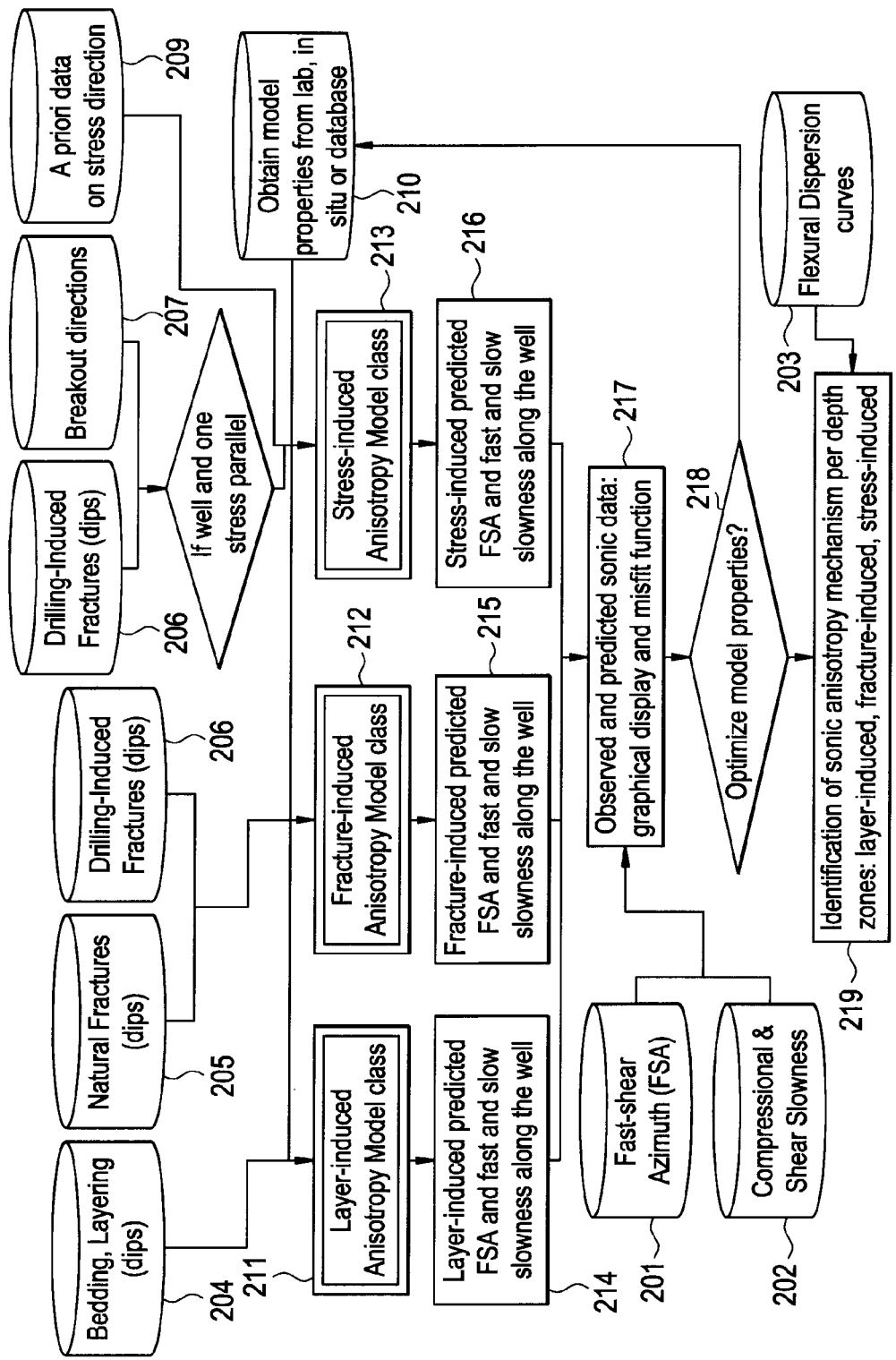
FIG. 2 illustrates Step 2 of at least one workflow diagram for identifying stress field characteristics from borehole sonic and image data, according to embodiments of the invention.

In accordance with at least one embodiment of the invention, the invention follows the three major steps in the workflow described below and on FIGS. 1, 2 and 3. The three major steps in the workflow are:

Step 1) System and data acquisition and processing of borehole sonic, image and petrophysical logs in wireline or logging-while-drilling mode (step 1 and FIG. 1);

Step 2) Identification of stress field characteristics from borehole sonic (FSA) and image data (e.g. fracture and bedding planes) through an integration of sonic and image log data. This new analysis is an extension of a previous methodology developed to discriminate fracture-induced anisotropy from stress-induced anisotropy [U.S. Pat. No. 7,457,194 issued to Prioul et al., Titled "Discriminating Natural Fracture and Stress-Induced Sonic Anisotropy Using A Combination of Image and Sonic Logs."] (Step 2 and FIG. 2); and Step 3) Estimation of principal stress directions and stress ellipsoid shape factor R using borehole sonic anisotropy directions (FSA) in one or multiple deviated boreholes, either independently or in combination with borehole failure directions (BOD and TFD) from image log data (step 3 and FIG. 3).

According to the at least one embodiment of the invention, the invention overcomes the prior art at least in step 3, wherein the prior art method existed using breakout or tensile fractures from borehole images [Etchecopar A., et al., Bor-Stress document and user manual, Schlumberger report, 2001]. However, the at least one embodiment of the invention brings forth at least two new components, by non-limiting example:

Component No. 1) New data from a different tool (sonic) and physics (wave propagation) by the way of the sonic anisotropy direction (FSA). This is not obvious in the sense that the relationships between stress directions and FSA are not straightforward in deviated wells. To shed light on this relationship, one needs numerical modeling of wave propagation in pre-stressed materials. This part is coming from a new understanding of the problem; and Component No. 2) The integration of data from different tools based on different physics, borehole sonic logs on one side and borehole ultrasonic or resistivity image logs on the other side, is not obvious. At least one of the novelties of this invention is the combining of two types of data (FSA and BOD, TFD directions) into a single grid search algorithm.

According to the at least one embodiment, the invention notes that: Step 1 relies on existing patents, publications, existing tools/system/services by Schlumberger or other companies, work done by other Schlumberger groups; and Step 2 can be skipped in cases where stress field characteristics are obviously identified on borehole sonic and image data or if either sonic log or image log are not acquired.

Step 1: System, Data Acquisition and Processing

It is noted the system, data acquisition and processing steps rely on industry standard techniques and contribute to the workflow as shown in FIG. 1.

1.1 of Step 1: System and Data Acquisition

According to the at least one embodiment, the invention can require the acquisition of either all or part of the following data in one or several (vertical or deviated) boreholes (over the whole or part of the depth range):

Wireline (or LWD if it exists) sonic logs with all modes: monopole, dipole and Stoneley (101) with 3D deviation survey;

Wireline or LWD electrical or ultrasonic image logs (102) with 3D deviation survey;

Wireline or LWD standard petrophysical logs (103).

According to the prior art, the previous data acquisition includes a device that measures the well orientation (deviation and azimuth) at every step of the log acquisition.

1.2 of Step 1: Data Processing (1.2.1) Identification of Borehole Sonic Anisotropy (104): At every depth, anisotropic processing of the sonic data (monopole, dipole and Stoneley) can be carried out based on preexisting methods. Monopole P- and S-waves, monopole Stoneley and cross-dipole shear sonic data in anisotropic formations can be used to estimate one compressional, up to two different dipole shear slownesses and one Stoneley slowness. This gives a measure of one compressional and up to three different shear elastic moduli when bulk density is known from petrophysical logs [Sinha, B., Sayers, C., and Endo, T, U.S. Pat. No. 6,714,480]. These data will be used as inputs and validation data in the present invention.

Sonic Processing Steps

Compressional slowness and moduli from monopole mode: The compressional slowness, $DTco_{meas}$, is estimated using the monopole mode, and correspond to a compressional wave propagating and polarized in the direction of the tool (approximation in anisotropic media). This allows the computation of the compressional elastic dynamic modulus for this particular well orientation.

Shear slowness anisotropy from dipole mode: Two shear slownesses, $DTs^{fast}_{meas}$ and $DTs^{slow}_{meas}$, are directly estimated from azimuthal anisotropy analysis of cross-dipole waveforms. This method further includes determining the fast shear direction (often called fast shear azimuth). Methods for determining the fast-shear direction include, but are not limited to Alford rotation [Alford, 1986; Esmersoy et al., 1994; Sinha et al., 2006; Esmersoy, C., 1993, U.S. Pat. No. 5,214, 613; Esmersoy, C., 1998, U.S. Pat. No. 5,808,963] and parametric inversion of the crossed-dipole waveforms [Sinha, B., Bose, S., and Huang, X., 2004, U.S. Pat. No. 6,718,266]. Dipole sonic azimuthal anisotropy is identified using a combination of factors: small minimum and large maximum energy in the cross-components of Alford-rotated waveforms, stable fast-shear polarization direction with small uncertainty, arrival-time difference observed on waveforms, and difference between fast- and slow shear slownesses.

For a given well trajectory, the fast-shear direction is measured in the plane crossing the tool and orthogonal to it (hereafter called cross-sectional plane). This allows the computation of the two shear elastic moduli (when bulk density is known from petrophysical logs) for this particular well orientation. The two shear slownesses correspond to the shear waves propagating in the direction of the tool and polarized in the plane orthogonal to the borehole and orthogonal to each other (approximation in anisotropic media).

Shear moduli from Stoneley mode: The Stoneley mode can be processed to estimate the Stoneley slowness $DTst_{meas}$ provided corrections are applied to remove any near-wellbore alteration and tool effects [Norris and Sinha, 1993; Sinha, B., Sayers, C., and Endo, T., 2004, U.S. Pat. No. 6,714,480]. Then, a third shear modulus for a shear wave propagating and polarized in the plane orthogonal to the borehole can be estimated from the Stoneley slowness, the borehole fluid density and fluid slowness.

Identification of the cause of anisotropy from dipole dispersion curves: Dipole dispersion curves are then used to identify the cause of anisotropy: (i) stress-induced effects using the characteristic crossover of the dipole curves [Sinha and Kostek, 1996; Winkler et al., 1998; Sinha et al., 2000; Sinha, B., Kostek, S., 1995, U.S. Pat. No. 5,398,215], or (ii) intrinsic- or fracture-induced anisotropy using the characteristics of parallel dispersion curves [Sinha et al., 1994; Sinha, B., Kostek, S., 1995, U.S. Pat. No. 5,398,215].

(1.2.2) Structural analysis using the borehole images (105): A structural interpretation of the images is performed to extract the geometry and morphology of bedding planes, layering, natural-fractures and stress-induced features. The analysis relies on existing methods based on geological knowledge [Luthi, S. M., 2000, Geological well logs: their use in reservoir modeling: Springer; M. D. Zoback, Reservoir Geomechanics (2007), Cambridge University Press]. The determination of the geometrical properties of the beddings or fractures includes the location and orientation of the ideal-plane representation of the beddings or fractures (given as depth z, dip angle, and dip azimuth).

(1.2.3) Processing of petrophysical logs for formation evaluation parameters (106): In following existing procedures to process petrophysical logs to estimate formation properties such as rock bulk density, porosity, and lithology indicators (e.g. sand, shale and carbonate). This step is important to provide critical inputs in the workflow (e.g. rock bulk density) and discriminate the relevant lithologies for the stress estimation.

Step 2: Identification of Stress Field Characteristics from Borehole Sonic and Image Data According to at least one embodiment of the invention, the invention uses a new analysis is an extension over the prior art's previous methodology developed to discriminate fracture-induced anisotropy from stress-induced anisotropy [US 60.1687 NP. Prioul et al., Discriminating natural fracture and stress-induced sonic anisotropy using a combination of image and sonic logs. Filed October 2006. Granted July 2008].

2.1 of Step 2: Input Data

To forward model the sonic response in the presence of anisotropy, three classes of models are defined: layer-induced anisotropy model class (211), fracture-induced anisotropy model class (212), and stress-induced anisotropy model class (213). There may be more than one forward-modeling approach per class, and detailed model inputs may differ depending on class and model. In addition, each model has one or more calibration parameters that allow the user to obtain a realistic match between model and observation.

(2.1.1) Inputs to forward models in the layer-induced anisotropy class: For this class the inputs broadly encompass, but are not limited to: bedding and layer data (depth, dip and azimuth) obtained from image logs (204); formation bulk density from standard petrophysical logs (208); wave velocities from sonic (202) (compressional, fast and slow shear, Stoneley); sonic fast shear azimuth (201); borehole survey (deviation and azimuth per depth); rock properties from lab, in-situ, or database (210).

(2.1.2) Inputs to forward models in the fracture-induced anisotropy class: For this class the inputs broadly encompass, but are not limited to: natural fracture data (depth, dip and azimuth) obtained from image logs (205) and drilling-induced fracture data (depth, dip and azimuth) obtained from image logs (206); formation bulk density from standard petrophysical logs (208); wave velocities from sonic (compressional, fast and slow shear) (202); sonic fast shear azimuth (201); borehole survey (deviation and azimuth per depth); rock properties from lab, in-situ, or database (210).

(2.1.3) Inputs to forward models in the stress-induced anisotropy class: For this class the inputs depend on an assumption related to the modeling. For example, if it is assumed that the borehole and one of the principal stress directions are parallel, then the inputs broadly encompass, but are not limited to: drilling-induced fracture data (depth, dip and azimuth) obtained from image logs (206) and breakout data (depth, direction) obtained from image logs (207); rock properties from lab, in-situ, or database (210); borehole survey (deviation and azimuth per depth).

However, if it is assumed that the borehole and one of the principal stress directions are not parallel, then the inputs broadly encompass, but are not limited to: a priori data on stress direction (209); rock properties from lab, in-situ, or database (210); borehole survey (deviation and azimuth per depth).

2.2 of Step 2: Forward Modeling of Sonic Anisotropy

Based on the chosen model and the corresponding input parameters, some (but not all) of the modeled sonic responses are the fast shear azimuth, fast and slow shear slowness, and the compressional slowness (214), (215), (216). The task here is to get modeled sonic results representative for what one would expect if the anisotropy mechanism corresponds to the chosen class, i.e. it is not necessarily the intention to get the best-fit between model and measurement. The model results are calculated from independent input data (i.e. the borehole image data) and realistic values for the calibration parameters. In general, the model results will differ depending on the model class.

In the next three subsections brief examples of the possible models for each of the classes will be provided. The models discussed are for illustrational purposes only, and there are more models that could be applied to forward model the effect of a particular anisotropy mechanism on sonic. However, all models have in common that they accept borehole geological information via borehole images or independent geological knowledge, and that they output modeled sonic results that can be compared to sonic measurements in order to establish the dominant anisotropy mechanism.

(2.2.1) Example of forward modeling of fracture-induced anisotropy: A forward model for anisotropy due to the presence of natural or drilling-induced fractures could be based on the so-called excess compliance tensor discussed by Sayers and Kachanov [Sayers, C. M., and Kachanov, M., 1991, A simple technique for finding effective elastic constants of cracked solids for arbitrary crack orientation statistics: International Journal of Solids and Structures, 12, 81-97], Sayers and Kachanov [Sayers, C. M., and Kachanov, M., 1995, Microcrack-induced elastic wave anisotropy of brittle rocks: J. Geophys. Res., 100, 4149-4156], and Schoenberg and Sayers [Schoenberg, M., and Sayers, C. M., 1995, Seismic anisotropy of fractured rock: Geophysics, 60, 204-211]:

$$s_{ijkl}^f = \frac{1}{4}(\delta_{ik}\alpha_{jl} + \delta_{il}\alpha_{jk} + \delta_{jk}\alpha_{il} + \delta_{jl}\alpha_{ik}) + \beta_{ijkl}$$

where $\delta_{ij}$ is the Kronecker delta, $\alpha_{ij}$ is a second-rank tensor, and $\beta_{ijkl}$ is a fourth-rank tensor defined by $$\alpha_{ij} = \frac{1}{V}\sum_r B_T^{(r)} n_i^{(r)} n_j^{(r)} A^{(r)}$$

$$\beta_{ijkl} = \frac{1}{V}\sum_r (B_N^{(r)} - B_T^{(r)}) n_i^{(r)} n_j^{(r)} n_k^{(r)} n_l^{(r)} A^{(r)}$$

In the above equations, the n-terms capture the orientation of a fracture observed on the borehole image data and present inside a particular depth window. The B-terms are the fracture normal and tangential compliances and these can be adjusted to obtain a better fit between observed and modeled sonic shear slownesses. The modeled sonic fast shear azimuth and three slownesses follow from an eigenvalue/eigenvector analysis of the total compliance tensor (background plus excess compliance due to fractures). The procedure is more extensively described in the patent [US 60.1687 NP. Prioul et al., Discriminating natural fracture and stress-induced sonic anisotropy using a combination of image and sonic logs. Filed October 2006. Granted July 2008] and in several journal publications, e.g. Prioul, R., A., Donald, R., Koepsell, Z. El Marzouki, T., Bratton, 2007, Forward modeling of fracture-induced sonic anisotropy using a combination of borehole image and sonic logs, Geophysics, Vol. 72, pp. E135-E147.

(2.2.2) Examples of forward modeling of layer-induced anisotropy A forward model for anisotropy due to the presence of a sequence of layers or beds of different lithology or due to a layer of material that is itself intrinsically anisotropic (such as a shale), could be based on a model similar to the one discussed above for fracture-induced anisotropy. Assuming the presence and orientation of the layers or beds is known from borehole image data, these beds could be treated as if they were fracture planes. Instead of treating each bedding plane individually, the average dip and dip direction inside the sonic window of interest could be used.

Another modeling option could be to use the full stiffness tensor in combination with eigenvalue/eigenvector analysis to obtain slownesses in a particular propagation direction and the corresponding fast shear azimuth. The full tensor could be derived from lab measurements on cores, or from analysis of data coming from multiple wells drilled through the same formation under different angles.

(2.2.2) Example of forward modeling of stress-induced anisotropy: One approach to forward-model the effect of subsurface stress on propagating sonic waves could start with the assumption that stress dependence (especially in clastic rocks such as sandstones) is due to the deformation of microcracks and boundaries between sand grains. When stressed, these contacts stiffen due to partial closure of the cracks or an overall increase in contact surface. Assuming a simple linear relationship between contact- or crack-compliance and stress, Sayers (2005, 2006) outlines an approach that yields an elastic compliance tensor that incorporates the effects of stress on a sandstone rock [Sayers, C M (2005) Sensitivity of elastic-wave velocities to stress changes in sandstones, The Leading Edge, December 2005, 1262-1266; Sayers, 2006, Sensitivity of time-lapse seismic to reservoir stress path, Geophysical prospecting]. This tensor could be analyzed to yield sonic slownesses and the fast shear azimuth. The orientation of the stress tensor, required to compose the compliance tensor, is derived from information such as a priori knowledge of local stress conditions, breakout directions and drilling-induced fractures, the latter two coming from borehole images or borehole shape analysis.

An alternative approach to model stress effects would be to utilize the observation by Prioul et al. (2004) that the change in stiffness coefficients due to a change in stress can be characterized by only three third-order coefficients, at least for isotropic and transverse isotropic media [Prioul, R., A. Bakulin, V. Bakulin (2004), Non-linear rock physics model for estimation of 3-D subsurface stress in anisotropic formations: Theory and laboratory verification, Geophysics, Vol. 69, pp. 415-425]. These three third-order coefficients can for instance be determined from lab measurements on stressed and unstressed cores. The third-order coefficients are incorporated into the effective elastic tensor coefficients for the stressed TI medium. Together with some knowledge of the orientation of the stress tensor (see first example of stress-induced modeling), the resulting effective tensor will yield sonic wavespeeds and fast shear azimuth through eigenvalue/eigenvector analysis.

2.3 of Step 2: Measurement Versus Model Comparison

The forward model results from the three different classes are compared (217) to the corresponding sonic measurements (201) (202), and at each depth level the dominant anisotropy mechanism is identified (219). If deemed sensible, the model calibration parameters can be adjusted and forward-model results can be re-evaluated (218). In addition to isotropy, the three mechanisms considered are: stress-induced anisotropy, fracture-induced anisotropy, and layer-induced anisotropy. If available, sonic dispersion curves (203) are used to independently confirm or reject the anisotropy characterization based on forward modeling. Those intervals that are characterized by their stress-induced anisotropy are input to the next and final part of this invention, estimation of stress direction and magnitude, as described in the next section.

Step 3: Estimation of Stress Direction and R from Sonic Anisotropy Directions (FSA) and Borehole Image Failure Directions (BOD and TFD)

Figure 3:
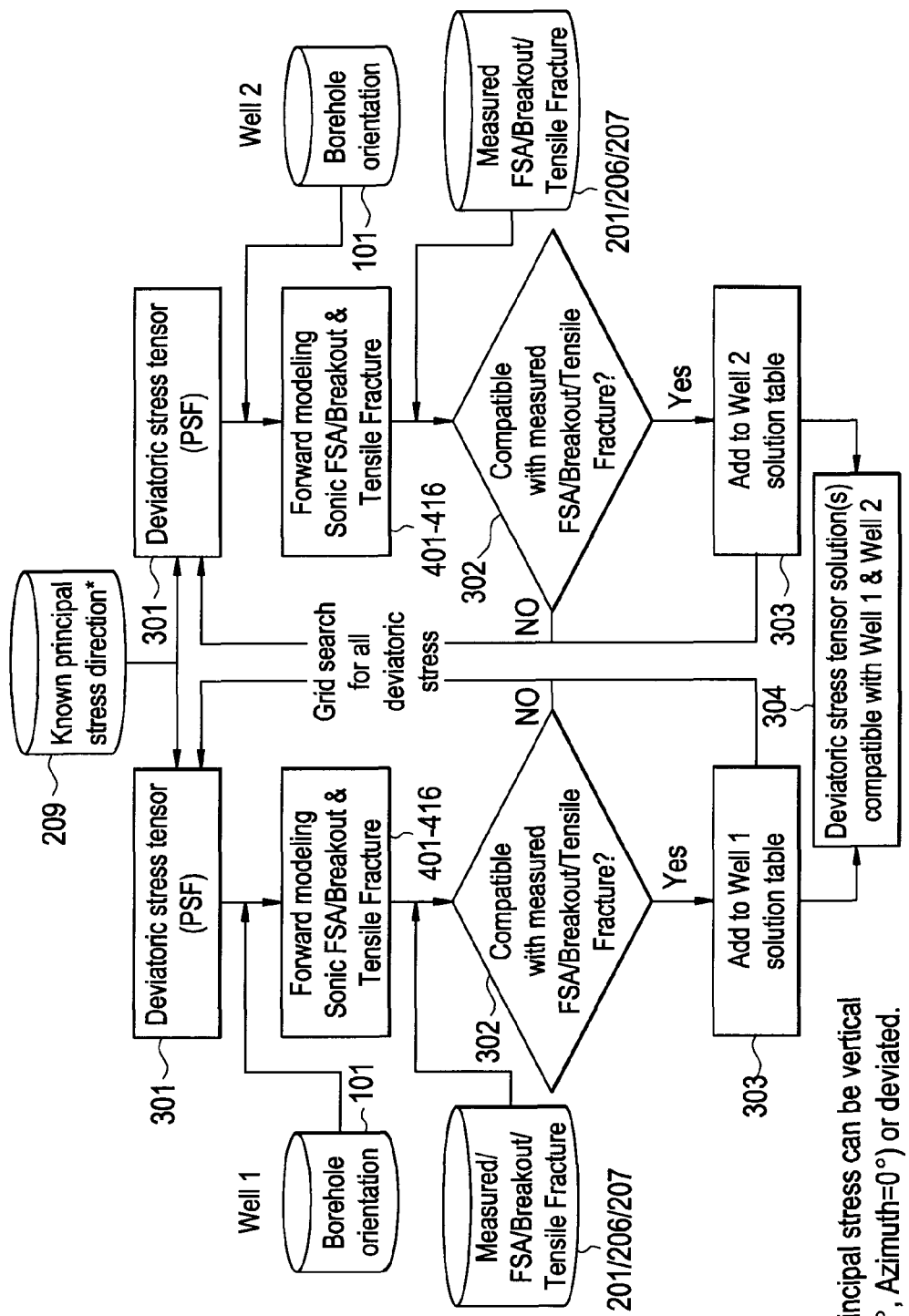
FIG. 3 illustrates Step 3 of at least one workflow diagram for estimating stress directions and R from borehole image and sonic data, according to embodiments of the invention.
Figure 4:
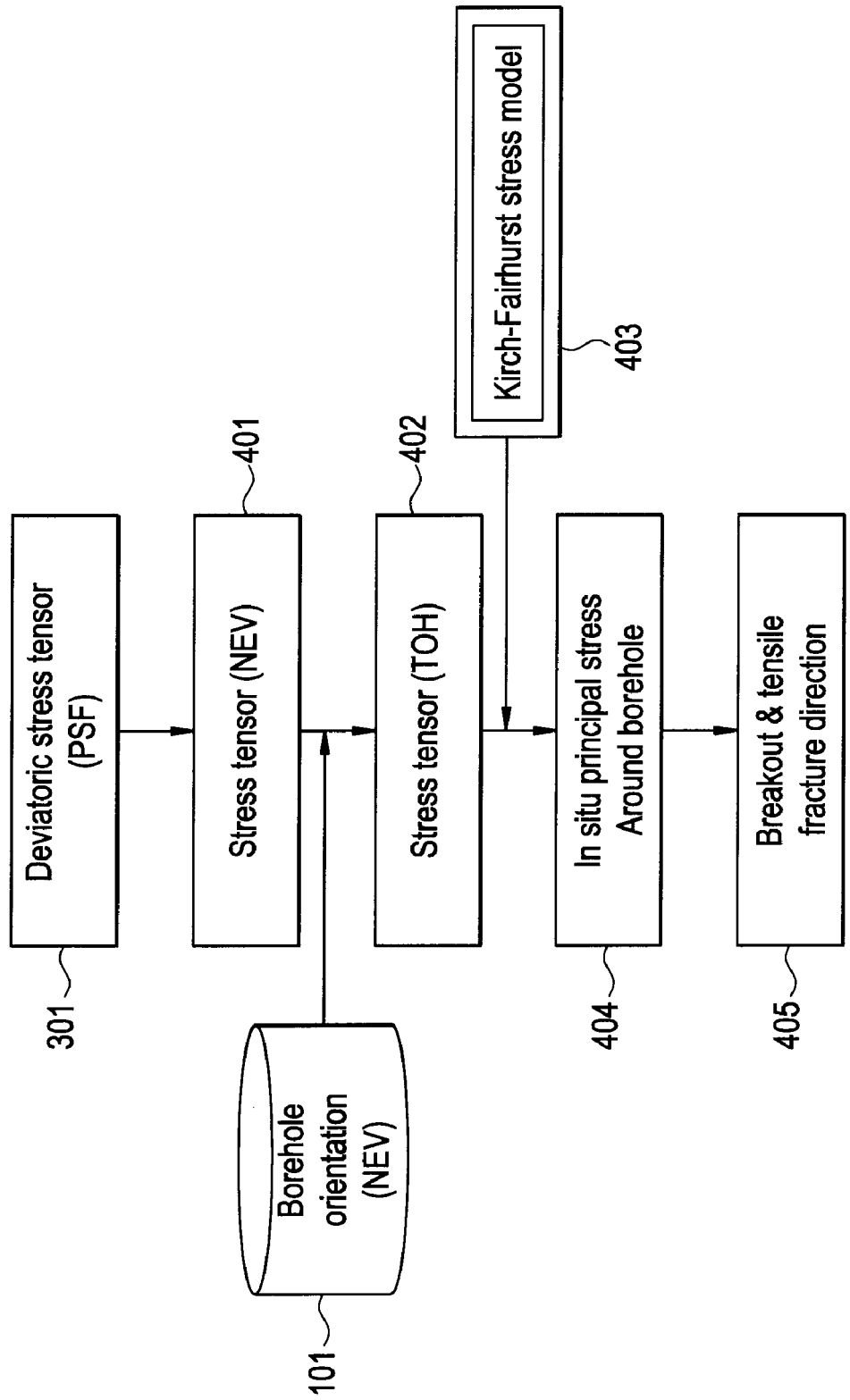
FIG. 4 illustrates Step 4 of at least one workflow diagram for forward modeling of breakout and tensile fracture directions, according to embodiments of the invention.
Figure 5:
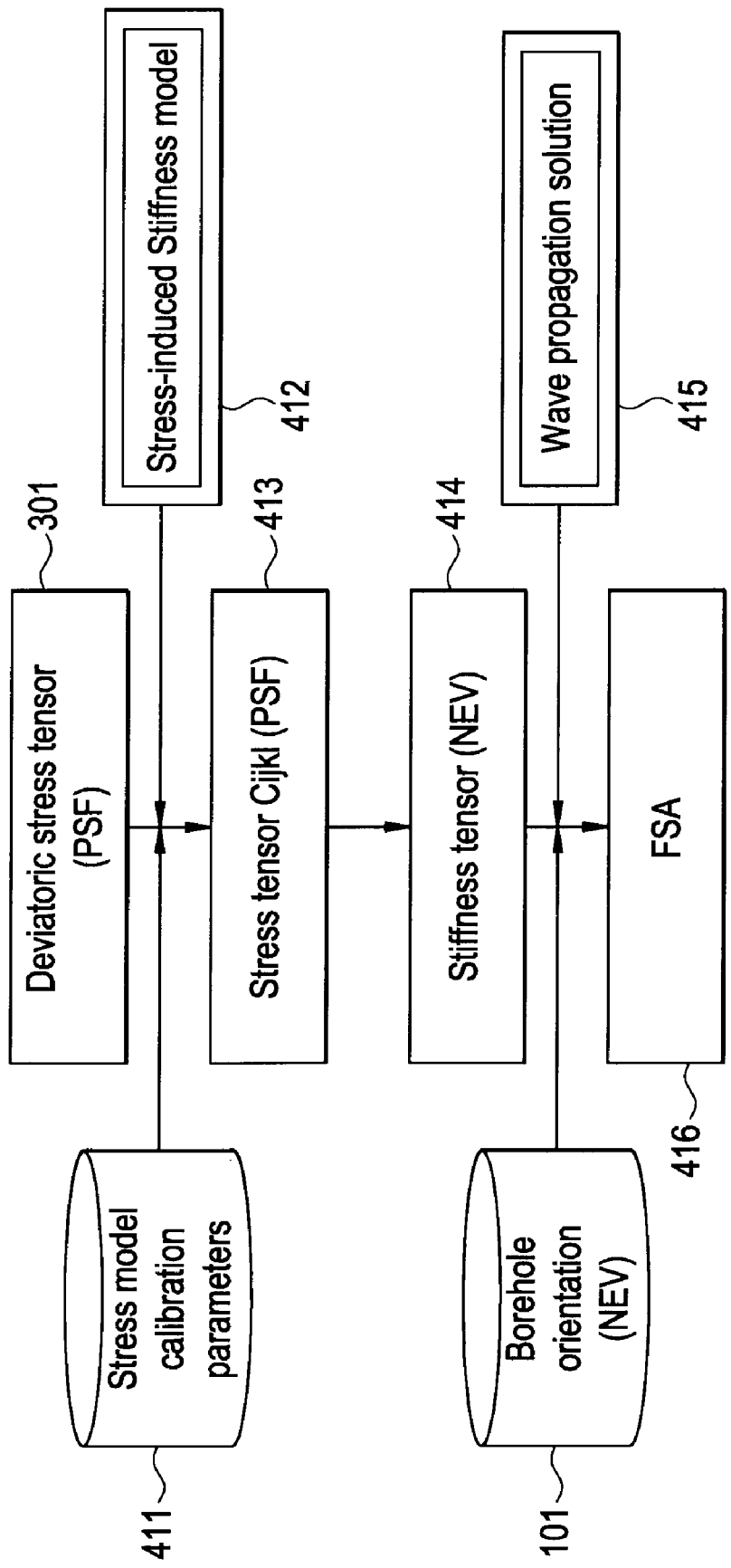
FIG. 5 illustrates Step 4 of at least one workflow diagram for the forward modeling of FSA directions, according to embodiments of the invention.

This part of the workflow is presented in FIG. 3 and in further detail in FIGS. 4 and 5.

The task of this part of the invention is to estimate deviatoric stress tensor characteristics (i.e. principal stress directions and the stress ellipsoid shape factor R) using borehole sonic anisotropy directions (FSA) in one or multiple deviated boreholes, either independently or in combination with borehole failure directions (BOD and TFD) from image log data. For this purpose, there is the need to forward model both stress-induced FSA and borehole failure (BOD and TFD) and compare the modeled results with measured FSA, BOD and TFD to estimate the stress directions and the shape factor R. The forward model is repeated using a grid search for stress directions and R.

3.1 of Step 3: Definition of Subsurface Stress Field (301)

It assume that one of the principal stress directions is known from either the previously described steps 1 (206 and 207) and 2, or from independent a priori knowledge (209). Further it is also assumed that compressive principal stress components are positive by convention. At each point in the subsurface, the stress tensor $\sigma$ is defined by three principal stress magnitudes: $\sigma_{known}$, $\sigma_{max\_in\_plane}$, $\sigma_{min\_in\_plane}$ as defined below:

$\sigma_{known}$ the principal stress with the known direction (orientation defined by dip $\Theta$ and azimuth $\Phi$);

$\sigma_{max\_in\_plane} > \sigma_{min\_in\_plane}$ the maximum and minimum principal stresses in the plane orthogonal to the direction of $\sigma_{known}$.

When the known stress direction is vertical, the three principal stresses, $\sigma_{known}$, $\sigma_{max\_in\_plane}$ and $\sigma_{min\_in\_plane}$ become the commonly used $\sigma_v$, $\sigma_H$ and $\sigma_h$ respectively. $\sigma_{known}$ can be the maximum, intermediate or minimum value of the three principal stresses (i.e. $\sigma_1$, $\sigma_2$ and $\sigma_3$, where $\sigma_1 > \sigma_2 > \sigma_3$).

Using matrix notation, the stress tensor can be written as:

$$\sigma = \begin{pmatrix} \sigma_{max\_in\_plane} & 0 & 0 \\ 0 & \sigma_{min\_in\_plane} & 0 \\ 0 & 0 & \sigma_{known} \end{pmatrix}$$

Thus, the stress tensor can be rewritten in terms of an isotropic part and deviatoric part as follows:

$$\sigma = \sigma_3 I + (\sigma_1 - \sigma_3)\sigma_d$$

Where I is the identity matrix and $\sigma_1$, $\sigma_2$ and $\sigma_3$ are the maximum, intermediate and minimum principal stresses respectively.

The deviatoric tensor, $\sigma_d$, is defined as follows:

$$\text{if } \sigma_{known} = \sigma_1, \text{ then } \sigma_d = \begin{pmatrix} R & 0 & 0 \\ 0 & 0 & 0 \\ 0 & 0 & 1 \end{pmatrix} \text{ as } \sigma = \begin{pmatrix} \sigma_2 & 0 & 0 \\ 0 & \sigma_3 & 0 \\ 0 & 0 & \sigma_1 \end{pmatrix}$$

$$\text{if } \sigma_{known} = \sigma_2, \text{ then } \sigma_d = \begin{pmatrix} 1 & 0 & 0 \\ 0 & 0 & 0 \\ 0 & 0 & R \end{pmatrix} \text{ as } \sigma = \begin{pmatrix} \sigma_1 & 0 & 0 \\ 0 & \sigma_3 & 0 \\ 0 & 0 & \sigma_2 \end{pmatrix}$$

$$\text{if } \sigma_{known} = \sigma_3, \text{ then } \sigma_d = \begin{pmatrix} 1 & 0 & 0 \\ 0 & R & 0 \\ 0 & 0 & 0 \end{pmatrix} \text{ as } \sigma = \begin{pmatrix} \sigma_1 & 0 & 0 \\ 0 & \sigma_2 & 0 \\ 0 & 0 & \sigma_3 \end{pmatrix}$$

where $$R = \frac{\sigma_2 - \sigma_3}{\sigma_1 - \sigma_3} \quad (0 \le R \le 1)$$

The deviatoric tensor $\sigma_d$ is then defined by three angles: Dip and azimuth of $\sigma_{known}$, and the azimuth of $\sigma_{max\_in\_plane}$, in addition to the shape factor R and the knowledge of the ordering giving which one of $\sigma_1$, $\sigma_2$, and $\sigma_3$ is $\sigma_{known}$.

When the orientation of $\sigma_{known}$ is known (dip $\Theta$ and azimuth $\Phi$), we have to invert for the following unknown for the deviatoric stress:

1. the azimuth of $\sigma_{max\_in\_plane}$,
2. the shape factor R,
3. the knowledge of the ordering giving which one of $\sigma_1$, $\sigma_2$, and $\sigma_3$ is $\sigma_{known}$ In order to capture the knowledge of the ordering (item 3) in a more convenient manner, it is also possible to define the following Q parameter:

$$Q = R \text{ if } \sigma_{known} = \sigma_1 \quad (0 \le Q < 1)$$

$$Q = 2 - R \text{ if } \sigma_{known} = \sigma_2 \quad (1 \le Q < 2)$$

$$Q = 2 + R \text{ if } \sigma_{known} = \sigma_3 \quad (2 \le Q < 3)$$

This makes the deviatoric stress a continuous function of Q. The scalar parameter Q varies between $0 \le Q < 3$. Hence, the unknown for the deviatoric stress become:

1. the azimuth of $\sigma_{max\_in\_plane}$,
2. the shape factor Q (capturing both R and the ordering), When the vertical direction is a principal stress direction, the parameter Q gives an indication of the stress regime:

$0 \le Q < 1$: $\sigma_v > \sigma_H > \sigma_h$ (normal faulting), $R = Q$ $1 \le Q < 2$: $\sigma_H > \sigma_v > \sigma_h$ (strike-slip faulting), $R = 2 - Q$ $2 \le Q < 3$: $\sigma_H > \sigma_h > \sigma_v$ (reverse faulting), $R = Q - 2$ For wells aligned with one principal stress, the parameter Q can also be estimated from sonic shear slowness as presented in another invention.

In summary, we intend to invert for the azimuth of $\sigma_{max\_in\_plane}$ and the shape factor Q using the directions of sonic anisotropy (FSA) either independently or in addition to borehole breakout directions (BOD). The orientation of $\sigma_{known}$ is known (dip $\Theta$ and azimuth $\Phi$).

The complete characterization of the stress tensor then requires the additional knowledge of two absolute magnitudes (two out of $\sigma_{known}$, $\sigma_{max\_in\_plane}$, $\sigma_{min\_in\_plane}$) and the pore pressure. However, this is outside of the scope of this patent and is considered as an obvious step.

3.2 of Step 3: Reference Frame Transformation

Three different coordinate systems are used in this invention: TOH, NEV and PSF. TOH is a tool-tied frame that plays an important role during data processing; NEV is a frame that is not tied to the tool and finds its use mostly on the interpretation side; PSF frame is tied to the in-situ principal stress directions. The main characteristics of each frame can be summarized as follows:

TOH The TOH (top of the hole) frame is a coordinate system tied to the tool/borehole. Hence, its x- and y-axes are contained in the plane perpendicular to the tool/borehole, and the z-axis is pointing along the borehole in the direction of increasing depth. The x-axis of the TOH frame is pointing to the top of the borehole, the y-axis is found by rotating the x-axis 90 degrees in the tool plane in a direction dictated by the right hand rule (thumb pointing in the positive z-direction).

NEV In the NEV (North-East-Vertical) frame, the x- and y-axes are contained in the horizontal plane with the x-axis pointing to the North, and the y-axis pointing to the East. The z-axis is pointing downwards along the vertical. This frame is sometimes also referred to as the Earth frame. The NEV frame is not the logical reference frame for tool measurement (since it is not tied to the tool), and as such is not suitable for use during data processing.

PSF The PSF (Principal Stress Frame) is a coordinate system tied to the three principal stress directions. The x-, y- and z-axes are pointing in the directions of $\sigma_{max\_in\_plane}$, $\sigma_{min\_in\_plane}$ and $\sigma_{known}$ respectively. The orientation of the z-axis (i.e. $\sigma_{known}$) is defined by two angles: the azimuth angle between the projection of $\sigma_{known}$ onto the North-East plane and the North direction, and the dip angle between $\sigma_{known}$ and the North-East plane. By convention, the z-axis is always pointing down. The x-axis (i.e. $\sigma_{max\_in\_plane}$) is located in the plane orthogonal to $\sigma_{known}$ and is defined by the angle between the most upward direction within the plane and $\sigma_{max\_in\_plane}$. The y-axis (i.e. $\sigma_{min\_in\_plane}$) then follows from applying the right-hand rule on the previously defined axes x and z.

The three systems are related through the coordinate transforms defined as follows.

3.2.1 Transformation from PSF to NEV (401)

$$\sigma_{PSF} = \begin{pmatrix} \sigma_{max\_in\_plane} & 0 & 0 \\ 0 & \sigma_{min\_in\_plane} & 0 \\ 0 & 0 & \sigma_{known} \end{pmatrix}$$

$$R_{PSF\_NEV} = \begin{pmatrix} \cos(\Phi) & -\sin(\Phi) & 0 \\ \sin(\Phi) & \cos(\Phi) & 0 \\ 0 & 0 & 1 \end{pmatrix} \begin{pmatrix} \cos(\Theta) & 0 & -\sin(\Theta) \\ 0 & 1 & 0 \\ \sin(\Theta) & 0 & \cos(\Theta) \end{pmatrix} \begin{pmatrix} 1 & 0 & 0 \\ 0 & \cos(\Psi) & -\sin(\Psi) \\ 0 & \sin(\Psi) & \cos(\Psi) \end{pmatrix}$$

$$\sigma_{NEV} = R_{PSF\_NEV} * \sigma_{PSF} * R'_{PSF\_NEV}$$

Where $\Phi$ azimuth of $\sigma_{known}$ (0° is North; clockwise positive rotation)

$\Theta$ dip angle of $\sigma_{known}$ (0° is horizontal; 90° is vertical)

$\Psi$ azimuth of $\sigma_{max\_in\_plane}$ (0° is the most upward direction within plane ($\sigma_{max\_in\_plane}$, $\sigma_{min\_in\_plane}$))

3.2.2 Transformation from NEV to TOH (402)

$$R_{NEV\_TOH} = \begin{pmatrix} \cos(\beta)\cos(\alpha) & \cos(\beta)\sin(\alpha) & -\sin(\beta) \\ -\sin(\alpha) & \cos(\alpha) & 0 \\ \sin(\beta)\cos(\alpha) & \sin(\beta)\sin(\alpha) & \cos(\beta) \end{pmatrix}$$

$$\sigma_{TOH} R_{NEV\_TOH} * \sigma_{NEV} * R'_{NEV\_TOH}$$

Where
- $\alpha$ is the azimuth of the borehole (0° is North; clockwise positive rotation)
- $\beta$ is the inclination of the borehole (90° is horizontal; 0° is vertical)

3.3 of Step 3: Forward Modeling of Breakout

FIG. 4 shows a workflow illustrating the forward modeling of breakout and tensile fracture directions. From a given deviatoric stress tensor (301) in the principal stress frame (PSF), it is possible to transform the tensor into the NEV frame (401, see section 3.2.1). With knowledge of the borehole orientation (101), it is also possible to transform the stress tensor from the NEV frame (401) to the TOH frame (402). From the Kirsch-Fairhurst expressions (403) given by Mastin [Mastin L. (1988), Effect of borehole deviation on breakout orientations, Journal of Geophysical Research, 93, B8, 9187-9195] for the analytical expressions for the stresses at the borehole wall for an arbitrary orientation of the borehole relative to the far-field in situ stress tensor (404), we get the following:

$$\sigma_r = \left(\frac{\sigma_x^0 + \sigma_y^0}{2}\right)\left(1 - \frac{a^2}{r^2}\right) + \left(\frac{\sigma_x^0 - \sigma_y^0}{2}\right)\left(1 + 3\frac{a^4}{r^4} - 4\frac{a^2}{r^2}\right)\cos 2\theta + \sigma_{xy}^0\left(1 + 3\frac{a^4}{r^4} - 4\frac{a^2}{r^2}\right)\sin 2\theta + P_w \frac{a^2}{r^2},$$

$$\sigma_\theta = \left(\frac{\sigma_x^0 + \sigma_y^0}{2}\right)\left(1 + \frac{a^2}{r^2}\right) - \left(\frac{\sigma_x^0 - \sigma_y^0}{2}\right)\left(1 + 3\frac{a^4}{r^4}\right)\cos 2\theta - \sigma_{xy}^0\left(1 + 3\frac{a^4}{r^4}\right)\sin 2\theta - P_w \frac{a^2}{r^2},$$

$$\sigma_z = \sigma_z^0 - \nu\left[2(\sigma_x^0 - \sigma_y^0)\frac{a^2}{r^2}\cos 2\theta + 4\sigma_{xy}^0 \frac{a^2}{r^2}\sin 2\theta\right],$$

$$\sigma_{r\theta} = \left[-\left(\frac{\sigma_x^0 - \sigma_y^0}{2}\right)\left(1 - 3\frac{a^4}{r^4} + 2\frac{a^2}{r^2}\right)\sin 2\theta\right] + \sigma_{xy}^0\left(1 - 3\frac{a^4}{r^4} + 2\frac{a^2}{r^2}\right)\cos 2\theta,$$

$$\sigma_{\theta z} = (-\sigma_{xz}^0 \sin\theta + \sigma_{yz}^0 \cos\theta)\left(1 + \frac{a^2}{r^2}\right),$$

$$\sigma_{rz} = (\sigma_{xz}^0 \sin\theta + \sigma_{yz}^0 \cos\theta)\left(1 - \frac{a^2}{r^2}\right),$$

Where
- a is the radius of the wellbore
- r is the distance from the center of the borehole
- $P_w$ is the internal wellbore pressure
- $\nu$ is the Poisson's ratio
- $\theta$ is measured clockwise from the x-axis (top of hole)

With this it is possible to compute the direction of breakouts (405) for any given borehole orientation as the angle for which the tangential stress $\sigma_\theta$ reaches a maximum value. The direction of tensile fractures is given by the angle for which the tangential stress $\sigma_\theta$ reaches a minimum value.

Any other stress model which provides the stresses at the borehole wall for an arbitrary orientation of the borehole relative to the far-field stresses, can be used as an alternative to the Kirsch-Fairhurst stress model in the forward modeling of breakout or tensile fracture directions.

3.4 of Step 3: Forward Modeling of FSA

FIG. 5 refers to the workflow which illustrates the forward modeling of FSA directions. From a given deviatoric stress tensor (301) in the principal stress frame (PSF), the effective stiffness tensor Cijkl (413) is computed as function of stress using a stress-induced stiffness model (412). Details of one particular model are presented below. The effective stiffness tensor Cijkl in the PSF frame is then rotated in the NEV frame (414). By using results from elastic wave propagation theory (such as the well-known Christoffel equation, 415), P- and S-wave velocities and polarization directions can be derived for any arbitrary wave propagation direction (101). The FSA (fast shear azimuth) can then be calculated (416) from the polarization direction of the fastest shear wave.

Details on Stress-Induced Stiffness Rock Physics Model:

An optional model to forward model sonic anisotropy could be a stress-induced stiffness rock physics model based on non-linear elasticity. Non-linear elasticity theory provides relationships between effective elastic stiffness tensor $C_{ijkl}$ and principal strains $\epsilon_{mn}$, that can be simplified for rocks [e.g. Prioul, R., A. Bakulin, V. Bakulin (2004), Non-linear rock physics model for estimation of 3-D subsurface stress in anisotropic formations: Theory and laboratory verification, Geophysics, Vol. 69, pp. 415-425]:

$$C_{ijkl} = A_{ijkl} + A_{ijklmn} \epsilon_{mn}$$

where $A_{ijkl}$ are the unstressed fourth-order stiffness tensor (so called second-order elastic constants $c_{ij}^0$ in Voigt notation) and $A_{ijklmn}$ is the sixth-order tensor (so called third-order elastic constants $c_{ijk}$ in Voigt notation). Subscripts (i,j,k,l) take values from 1 to 3 in tensorial form and values from 1 to 6 in Voigt matrix form. Principal strains $\epsilon_{mn}$ should be related to principal stresses $\sigma_{ij}$ via non-linear Hooke's law:

$$\epsilon_{ij} = A_{ijkl}^{-1}\sigma_{kl} - A_{ijkl}^{-1} A_{lmno}^{-1} A_{pqrs}^{-1} A_{klnors}\sigma_{lm}\sigma_{pq}$$

For small stress and strains, the second (non-linear) term on the right hand side is small enough to be ignored. To compute strains, we are using only the first (linear) term of the Hooke's law.

When the rock is isotropic in the unstressed state, two second-order and three third-order elastic constants are needed to describe the rocks, and the stressed elastic medium has orthorhombic symmetry as follows:

$$c_{11} = c_{33}^0 + c_{111}\epsilon_{11} + c_{112}\epsilon_{22} + c_{112}\epsilon_{33}$$

$$c_{22} = c_{33}^0 + c_{112}\epsilon_{11} + c_{111}\epsilon_{22} + c_{112}\epsilon_{33}$$

$$c_{33} = c_{33}^0 + c_{112}\epsilon_{11} + c_{112}\epsilon_{22} + c_{111}\epsilon_{33}$$

$$c_{23} = c_{12}^0 + c_{123}\epsilon_{11} + c_{112}\epsilon_{22} + c_{112}\epsilon_{33}$$

$$c_{13} = c_{12}^0 + c_{112}\epsilon_{11} + c_{123}\epsilon_{22} + c_{112}\epsilon_{33}$$

$$c_{12} = c_{12}^0 + c_{112}\epsilon_{11} + c_{112}\epsilon_{22} + c_{123}\epsilon_{33}$$

$$c_{44} = c_{44}^0 + c_{144}\epsilon_{11} + c_{155}\epsilon_{22} + c_{155}\epsilon_{33}$$

$$c_{55} = c_{44}^0 + c_{155}\epsilon_{11} + c_{144}\epsilon_{22} + c_{155}\epsilon_{33}$$

$$c_{66} = c_{44}^0 + c_{155}\epsilon_{11} + c_{155}\epsilon_{22} + c_{144}\epsilon_{33}$$

where $c_{111}$, $c_{112}$, $c_{123}$ are the three independent parameters with $c_{144} = (c_{122} - c_{123})/2$ and $c_{155} = (c_{111} - c_{112})/4$. The two independent second-order parameters are chosen here as $C_{33}^0$ and $c_{44}^0$ with $c_{12}^0 = c_{33}^0 - 2c_{44}^0$ (or equivalently by the Lame parameters $c_{33}^0 = \lambda + 2\mu$, $c_{44}^0 = \mu$, and $c_{12}^0 = \lambda$). The stress sensitivity of P-wave velocity (associated with $c_{11}$, $c_{22}$, and $c_{33}$)

are controlled by non-linear coefficients $c_{111}$ and $c_{112}$ whereas S-wave (associated with $c_{44}$, $c_{55}$, and $c_{66}$) are controlled by non-linear coefficients $c_{144}$ and $c_{155}$.

The Hooke's law becomes:

$$\sigma hd_{ij} = \lambda \delta_{ij}\epsilon_{\alpha\alpha} + 2\mu\epsilon_{ij}$$

where $\epsilon_{\alpha\alpha}$ is the volumetric strain (sum over repeated index). The inverse gives:

$$\varepsilon_{ij} = \frac{1}{E}((1+\nu)\sigma_{ij} - \nu\delta_{ij}\sigma_{\alpha\alpha})$$

where $\sigma_{\alpha\alpha}$ is the mean stress times 3 (sum over repeated index) and E and $\nu$ are respectively the Young modulus and Poisson's ratio. It is worth remembering that $\nu=\lambda/(2(\lambda+\mu))$ and $\mu=E/(2(1+\nu))$.

Then, the stress-induced stiffnesses can be used to solve the analytic description of plane waves in anisotropic media (so-called Christoffel equation) for slowness p and polarization U vectors:

$$F_i^{(Q)} = G_{ik}^{(Q)} U_k^{(Q)} - U_i^{(Q)} = 0$$

where $$G_{ik}^{(Q)} = a_{ijkl} p_j^{(Q)} p_l^{(Q)}$$

$(Q=P,S_1,S_2; k=1,2,3)$

The polarization vectors $U^{(Q)}$ are normalized and define the wave type according to the inequality $|p^{(P)}=n/V_P| < |p^{(S_1)}=n/V_{S_1}| < |p^{(S_2)}=n/V_{S_2}|$ where $V_{(Q)}$ is the phase velocity and n is the unit vector orthogonal to the wavefront).

The FSA (fast shear azimuth) can then be calculated from the polarization direction $U^{(S_1)}$ of the fastest shear wave $(p^{(S_1)}=n/V_{S_1})$.

Alternative Model:

The workflow presented on FIG. 5 is given as an example. Models computing the sonic FSA in a pre-stressed medium by means of wave propagation within a fluid-filled borehole can be considered as an alternative. This includes models generating synthetic sonic waveforms, including near-wellbore stress concentration effects.

3.5 of Step 3: Estimation of Stress Directions and R

By returning to the main task symbolized by the workflow presented in FIG. 3.

The task of this part of the invention is to estimate principal stress directions and the stress ellipsoid shape factor R using borehole sonic anisotropy directions (FSA) in one or multiple deviated boreholes, either independently or in combination with borehole failure directions (BOD and TFD) from image log data. For this purpose, we presented how to forward model both stress-induced FSA and borehole failure directions (BOD and TFD).

(3.5.1) Inputs to direction and R estimation: For this class the inputs encompass but are not limited to: a priori data on stress direction (209); sonic anisotropy directions (FSA, 201) and tensile fracture directions (BOD and TFD, 207 and 207, respectively).

(3.5.1) Estimation of stress direction and R workflow: We invert for the azimuth of $\sigma_{max\_in\_plane}$ and the shape factor Q using the directions of sonic anisotropy (FSA) either independently or in addition to borehole breakout directions (BOD). The orientation of $\sigma_{known}$ is known (dip $\Theta$ and azimuth $\Phi$) from one of the previously discussed steps 1 (206 and 207) or 2, or alternatively from independent a priori knowledge (209).

The forward model is repeated for different deviatoric stress tensor, i.e. different sets of azimuth of $\sigma_{max\_in\_plane}$ and Q. For example, the different sets of $(\sigma_{max\_in\_plane}, Q)$ can be predefined by specifying all angles between 0° and 180° with 1° step for the azimuth of $\sigma_{max\_in\_plane}$ and all values between 0 and 3 with 0.1 step for Q (i.e. a grid of all azimuth of $\sigma_{max\_in\_plane}$ [0°:1:180°] and Q [0:0.1:3]). At each point of the grid, it is possible to compare the modeled results with measured FSA, BOD and TFD to retain solutions which show a good match.

Example

Using Workflow Shown on FIG. 3

For example there are stress-induced FSA measurements from a well (well 1). For each possible combination of $\sigma_{max\_in\_plane}$ azimuth and Q, we compute the deviatoric stress tensor (301). We then perform the forward modeling of FSA (401-404, 411-416, see section 3.4) to predict the FSA for well 1 (101). The predicted FSA is compared with the measured FSA (302) in the same depth range. If the difference between the measured and predicted angles (called also "misfit") are less than a defined tolerance value (for example 5 degrees), then the solution is considered acceptable and the solution for $\sigma_{max\_in\_plane}$ azimuth and Q will be added into well 1 solution table (303). The complete well 1 solution table is built after grid search over all the possible $\sigma_{max\_in\_plane}$ azimuth and Q combinations.

The same grid search will be repeated for the second well (well 2) in which we have FSA or BOD (or TFD) measurements. If the available measurements are breakouts, the forward modeling for breakout instead of FSA will be performed. We can then get the solutions table for well 2.

Comparing the solution tables for well 1 and well 2 (304), the $\sigma_{max\_in\_plane}$ azimuth and Q (therefore deviatoric stress tensor) solutions compatible with both well 1 and well 2 can be derived.

Additional wells can be added if data are available. If solutions for all wells are compatible, this validates the existence of homogeneous stress field directions and R factors. If solutions are incompatible, this indicates that the stress may not be homogeneous.

Only one deviated well is necessary if the $\sigma_{max\_in\_plane}$ azimuth is known, which can be used as an a priori constrain to derive Q. Therefore, the invention is not limited to a minimum requirement of two wells.

Hence, the deliverable of this invention is a complete estimation of the deviatoric stress tensor, i.e. the principal stress directions and R.

The complete characterization of the stress tensor then requires the additional knowledge of two absolute magnitudes (two out of $\sigma_{known}$, $\sigma_{max\_in\_plane}$, $\sigma_{min\_in\_plane}$) and the pore pressure. In this case, the general 6-steps procedure detailed in the background section can be used.

Figure 6:
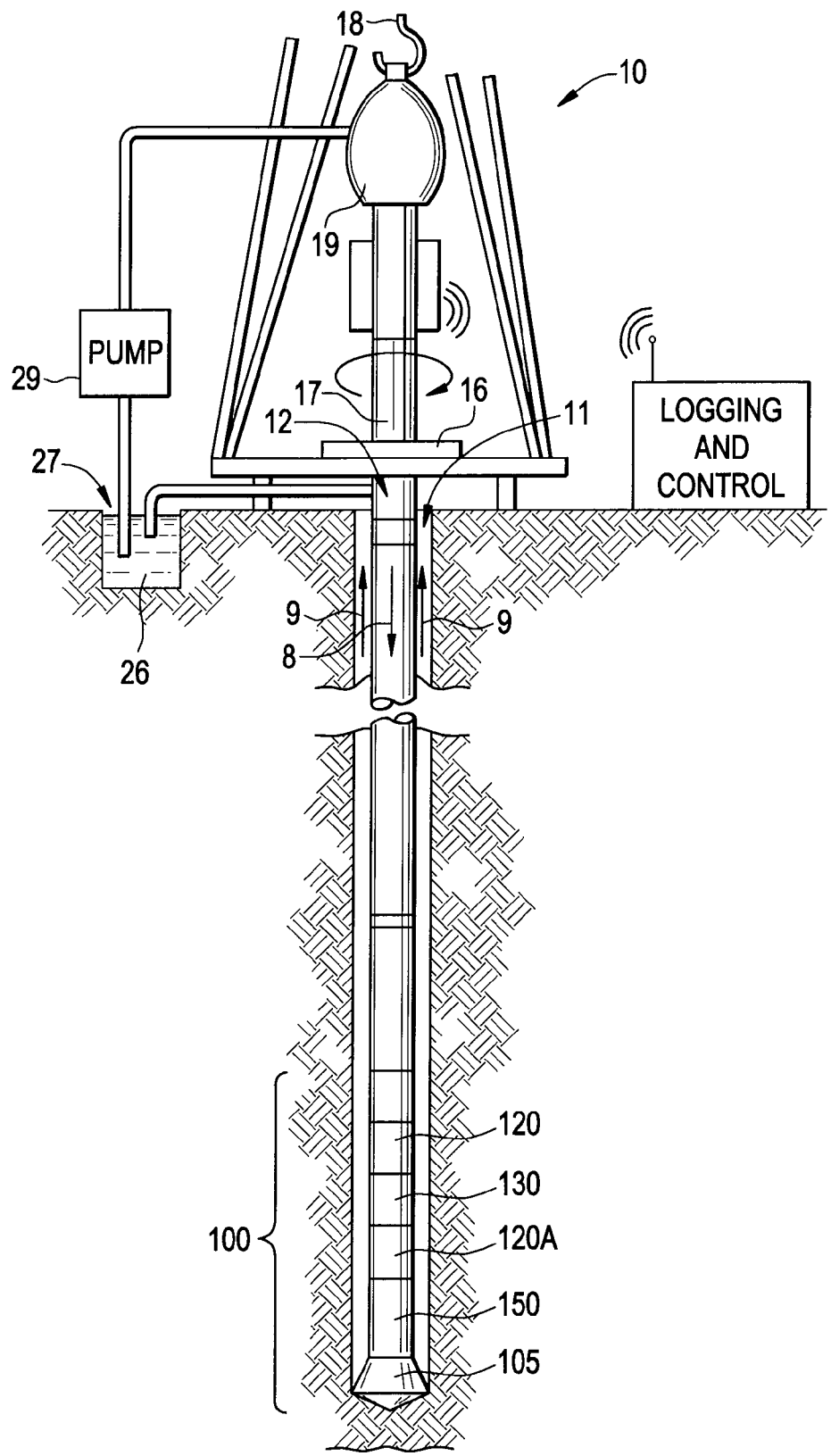
FIG. 6 illustrates a known wellsite system in which the present invention can be employed with at least one embodiment of the invention.

Overview of Types of Sonic Logging-while-Drilling Devices that can be Employed with at Least One Embodiment of the Invention FIG. 6 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

Still referring to FIG. 6, a drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

Also referring to FIG. 6, according to the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a sonic measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

Figure 7:
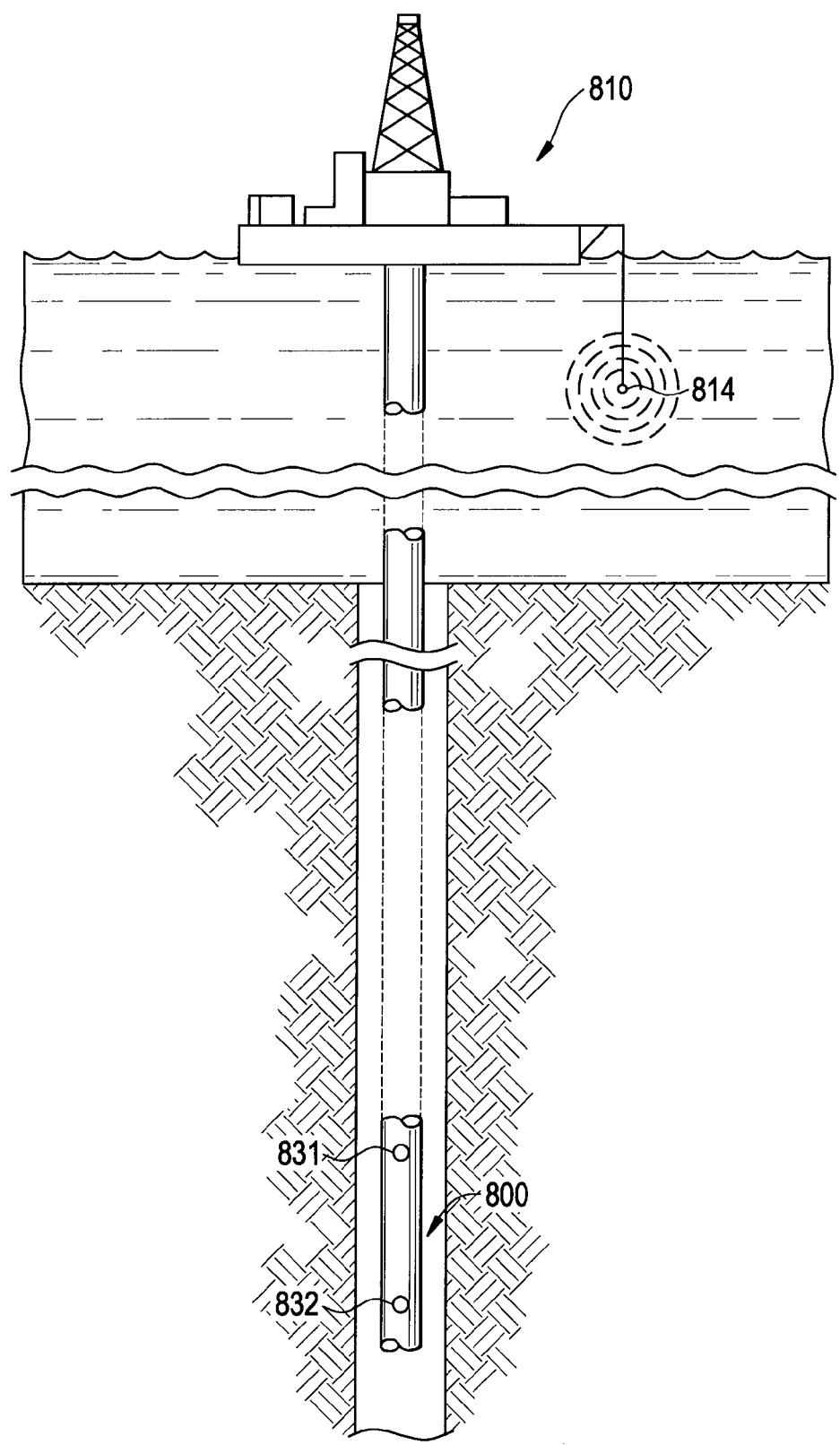
FIG. 7 illustrates known types of sonic logging-while-drilling devices that can be used with at least one embodiment of the invention.

FIG. 7 illustrates a sonic logging-while-drilling tool which can be the LWD tool 120, or can be a part of an LWD tool suite 120A of the type described in U.S. Pat. No. 6,308,137, incorporated herein by reference. In a disclosed embodiment, as shown in FIG. 1, an offshore rig 810 is employed, and a sonic transmitting source or array 814 is deployed near the surface of the water. Alternatively, any other suitable type of uphole or downhole source or transmitter can be provided. An uphole processor controls the firing of the transmitter 814. The uphole equipment can also include acoustic receivers and a recorder for capturing reference signals near the source. The uphole equipment further includes telemetry equipment for receiving MWD signals from the downhole equipment. The telemetry equipment and the recorder are typically coupled to a processor so that recordings may be synchronized using uphole and downhole clocks. The downhole LWD module 800 includes at least acoustic receivers 831 and 832, which are coupled to a signal processor so that recordings may be made of signals detected by the receivers in synchronization with the firing of the signal source.

One or more embodiments of the present invention have been described. Nevertheless, it will be understood that various modifications may be made without departing from the spirit and scope of the invention. It is noted that the foregoing examples have been provided merely for the purpose of explanation and are in no way to be construed as limiting of the present invention. While the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for estimating stress characteristics of formations, the method comprising the steps of:
   a) acquiring one of sonic anisotropy data, image data or both associated with one or more borehole wherein the one or more borehole is one of vertical, deviated or both;
   b) employing the sonic anisotropy data to estimate fast shear direction (FSA) so as to extract FSA observed data;
   c) computing the FSA from forward modeling, wherein the forward modeling utilizes a first deviatoric stress tensor to extract FSA predicted data;
   d) computing FSA misfit from the difference between the FSA observed data and the FSA predicted data to obtain a computed FSA misfit that relates to the first deviatoric stress tensor;
   e) if the computed FSA misfit is equal to or less than a defined value, then store the computed FSA misfit;
   f) repeat steps (c) thru (e) using another deviatoric stress tensor such that a different deviatoric stress tensor is used for each repeat, until one of all or multiple pre-defined deviatoric stress tensors have been applied in step (c); and
   g) selecting the smallest stored computed misfit from the group consisting of the stored computed FSA misfit, one or more other stored computed misfit or some combination thereof, to determine a final estimated deviatoric stress tensor whereby the final estimated deviatoric stress tensor is used for reservoir activities.

2. The method of claim 1, including the further step of storing with the computed FSA misfit of step (e), the first deviatoric stress tensor.

3. The method of claim 1, further comprising after repeating steps (c) thru (e), storing the computed FSA misfit of step (e) along with storing the respective deviatoric stress tensor.

4. The method of claim 3, including the further step of storing with the final estimated deviatoric stress of step (g), the respective deviatoric stress tensor.

5. The method of claim 1, wherein the deviatoric stress tensor includes principal stress directions and deviatoric stress factor R.

6. The method of claim 1, wherein the one or more other stored computed misfit is one of a computed borehole break direction (BOD) misfit, a computed tensile fracture direction (TFD) misfit, or both.

7. The method of claim 6, wherein the computed BOD misfit and the computed TFD misfit are calculated by the steps of:
- a) employing the image data to identify borehole failure type and orientation, wherein the image data includes one of the BOD, the TFD or both so as to extract one of a BOD observed data, a TFD observed data, or both;
- b) computing one of the BOD, the TFD or both from forward modeling, wherein the forward modeling utilizes the first deviatoric stress tensor to extract one of a BOD predicted data, a TFD predicted data or both;
- c) computing the BOD misfit from the difference between the BOD observed data and the BOD predicted data to obtain a computed BOD misfit which relates to the first deviatoric stress tensor;
- d) if the computed BOD misfit is equal to or less than a second defined value, then store the computed BOD misfit and the first deviatoric stress tensor;
- e) repeat steps (b) thru (d) using another deviatoric stress tensor such that a different deviatoric stress tensor is used for each repeat, until one or more predefined deviatoric stress tensors have been applied in step (b), then after repeating steps (b) thru (d), storing the computed BOD misfit of step (d) along with storing the respective deviatoric stress tensor;
- f) computing TFD misfit from the difference between the TFD observed data and the TFD predicted data to obtain the computed TFD misfit which relates to the first deviatoric stress tensor; and
- g) if the computed TFD misfit is equal to or less than a third defined value, then store the computed TFD misfit and the first deviatoric stress tensor;
- h) repeat steps (b), (f) thru (g) using another deviatoric stress tensor such that a different deviatoric stress tensor is used for each repeat, until one of all or multiple predefined deviatoric stress tensors have been applied in step (b), then after repeating steps (b), (f) thru (g), storing the computed FSA misfit of step (g) along with storing the respective deviatoric stress tensor.

8. The method of claim 7, wherein further including in step (b) replacing the forward modeling that utilizes first deviatoric stress tensor with:
1) having a given deviatoric stress tensor in a principal stress frame (PSF), such that the given deviatoric stress tensor is transformed into a north-east vertical frame (NEV);
2) transforming the given deviatoric stress tensor from the NEV frame to a top of the borehole frame (TOH) using previously stored borehole orientation data; and
3) using analytical expressions for stresses at one or more borehole wall for an arbitrary orientation of the borehole (Kirsch-Fairhurst Stress Model), relative to a far-field in situ stress tensor provides computing a direction of BOD for any one of the one or more borehole orientation as an angle for which a tangential stress reaches a maximum value, whereby the TFD is provided by an angle for which the tangential stress reaches a minimum value.

9. The method of claim 8, wherein further including in step (3) replacing the Kirsch-Fairhurst Stress Model with at least one other stress model that provides for stresses at the borehole wall for an arbitrary orientation of the borehole relative to the far-field stress.

10. The method of claim 7, wherein the FSA is combined with one of BOD, TFD, or some combination thereof, so as to be combined into a single grid search algorithm.

11. The method of claim 1, wherein further including in step (c) replacing the forward modeling utilizing first deviatoric stress tensor with:
1) having a given deviatoric stress tensor in a principal stress frame (PSF);
2) computing an effective stiffness tensor (Cijkl) as a function of stress using a stress-induced stiffness model provides for an effective stiffness tensor (Cijkl) in the PSF frame;
3) rotating the effective stiffness tensor (Cijkl) in the PSF frame in a north-east vertical frame (NEV) in combination with: A) incorporating results from an elastic wave propagation theory; and B) incorporating P- and S-wave velocities and polarization directions derived from an arbitrary wave propagation; and
4) computing the FSA from a polarization direction of a fastest shear wave.

12. The method of claim 11, wherein further including in step (2) replacing the stress-induced stiffness model with at least one other stress-induced stiffness rock physics model.

13. The method of claim 11, wherein replacing steps (2) and (3) with a different stress-induced stiffness model and a propagation theory having at least one other model.

14. The method of claim 1, wherein sonic anisotropy data includes borehole sonic logs.

15. The method of claim 1, wherein image data includes one of borehole ultrasonic logs, resistivity image logs, borehole ultrasonic logs and resistivity image logs, or some combination thereof.

16. The method of claim 1, wherein the FSA data is combined with one of BOD, TFD or some combination thereof, so as to be combined into a single grid search algorithm.

17. The method of claim 1, wherein forward modeling is based on a mechanical model.

18. The method of claim 1, wherein further including in step (b) the employing of the sonic anisotropy data to estimate fast shear direction (FSA) is performed in stress-sensitive rock formations.

19. The method of claim 1, wherein the deviatoric stress tensor is further defined by stress directions and stresses regime factor Q.

20. The method of claim 1, wherein failure is further defined from the group consisting of: a borehole breakout, a borehole tensile fracture, a tensile fracture, a borehole drilling induced fracture, a drilling induced fracture, a borehole hydraulic fracture, a hydraulic fracture, a borehole shear fracture or a shear fracture.

21. The method of claim 1, wherein further including in step (b):
i) calculating a predicted modeled FSA data from forward modeling, wherein the forward modeling includes a group consisting of one of a forward modeling of fracture-induced anisotropy, forward modeling of layer-induced anisotropy, forward modeling of stress-induced anisotropy or any combination thereof;
ii) comparing the calculated predicted modeled FSA data with the extracted observed FSA data to obtain an modeled FSA error that identifies extracted observed FSA data having stress-induced anisotropy origin; and
iii) if the modeled FSA error is equal to or less than a defined value, then store the modeled FSA error which identifies extracted observed FSA data having stress-induced anisotropy origin then go to step (c), otherwise repeat steps (i) thru (ii) and if no extracted observed FSA data having stress-induced anisotropy origin is identified, then go to step (a).

22. The method of claim 1, wherein the forward modeling includes a fracture-induced anisotropy model and one of inputs of natural fracture dip, inputs of drilling induced fracture dip, an another fracture data or any combination thereof.

23. The method of claim 1, wherein the forward modeling includes a layer-induced anisotropy model and one of inputs of bedding dip, an another geological layering data or any combination thereof.

24. The method of claim 1, wherein the forward modeling includes a stress-induced anisotropy model and one of inputs of drilling induced fracture dip, inputs of breakout-direction, inputs of stress directions data or any combination thereof.

25. An apparatus for estimating stress characteristics of formations, the apparatus comprising:
a memory operable to store image data and a sonic anisotropy data associated with one or more borehole wherein the one or more borehole is one of vertical, deviated or both;
circuitry operable to employ the sonic anisotropy data to estimate fast shear direction (FSA) so as to extract FSA observed data;
circuitry operable to employ computing the FSA from forward modeling, wherein the forward modeling utilizes a first deviatoric stress tensor to extract FSA predicted data; circuitry operable to employ computing FSA misfit from the difference between the FSA observed data and the FSA predicted data to obtain a computed FSA misfit that relates to the first deviatoric stress tensor; circuitry operable to determine if the computed FSA misfit is equal to or less than a defined value, then stores the computed FSA misfit and the first deviatoric stress tensor in the memory;
repeat computing FSA misfit using another deviatoric stress tensor such that a different deviatoric stress tensor is used for each repeat, until one of all or multiple predefined deviatoric stress tensors have been applied while computing the FSA from forward modeling, then store the repeated computed FSA misfit along with storing the respective deviatoric stress tensor; and
circuitry operable to selecting the smallest stored computed misfit from the group consisting of the stored computed FSA misfit and their respective deviatoric stress tensor, one or more other stored computed misfit and their respective deviatoric stress tensor or some combination thereof, to determine a final estimated deviatoric stress tensor whereby the final estimated deviatoric stress tensor is used for reservoir activities.

26. The apparatus of claim 25, wherein the first deviatoric stress tensor includes principal stress directions and deviatoric stress factor R.

27. The apparatus of claim 25, wherein the one or more other stored computed misfit is one of computed borehole break direction (BOD) misfit or computed tensile fracture direction (TFD) misfit.

28. The apparatus of claim 27, wherein the circuitry is operable for computing BOD misfit and TFD misfit by:
a) circuitry operable for employing the image data to identify borehole failure type and orientation, wherein the image data includes one of BOD, TFD or both so as to extract one of BOD observed data, TFD observed data, or both;
b) computing one of the BOD, TFD or both from forward modeling, wherein the forward modeling utilizes the first deviatoric stress tensor to extract one of BOD predicted data, TFD predicted data or both;
c) computing BOD misfit from the difference between the BOD observed data and the BOD predicted data to obtain the computed BOD misfit which relates to the first deviatoric stress tensor;
d) circuitry operable to determine if the computed BOD misfit is equal to or less than a second defined value, then store the computed BOD misfit and the first deviatoric stress tensor;
e) repeat computing BOD misfit using another deviatoric stress tensor such that a different deviatoric stress tensor is used for each repeat, until one of all or multiple predefined deviatoric stress tensors have been applied while computing the BOD from forward modeling, then store the repeated computed BOD misfit along with storing the respective deviatoric stress tensor;
f) computing TFD misfit from the difference between the TFD observed data and the TFD predicted data to obtain the computed TFD misfit which relates to the first deviatoric stress tensor; and
g) if the computed TFD misfit is equal to or less than a third defined value, then store the computed TFD misfit and the first deviatoric stress tensor;
h) repeat computing TFD misfit using another deviatoric stress tensor such that a different deviatoric stress tensor is used for each repeat, until one of all or multiple predefined deviatoric stress tensors have been applied while computing the TFD from forward modeling, then store the repeated computed TFD misfit along with storing the respective deviatoric stress tensor.

29. The apparatus of claim 28, wherein further including replacing the first deviatoric stress tensor with:
1) having a given deviatoric stress tensor in a principal stress frame (PSF), such that the given deviatoric stress tensor is transformed into a north-east vertical frame (NEV);
2) transforming the given deviatoric stress tensor from the NEV frame to a top of the borehole frame (TOH) using previously stored borehole orientation data; and
3) using analytical expressions for stresses at one or more borehole wall for an arbitrary orientation of the borehole (Kirsch-Fairhurst Stress Model), relative to a far-field in situ stress tensor provides computing a direction of BOD for any one of the one or more borehole orientation as an angle for which a tangential stress reaches a maximum value, whereby the TFD is provided by an angle for which the tangential stress reaches a minimum value.

30. The apparatus of claim 29, wherein further including replacing the Kirsch-Fairhurst Stress Model with at least one other stress model that provides for stresses at the borehole wall for an arbitrary orientation of the borehole relative to the far-field stress.

31. The apparatus of claim 25, wherein further including replacing the first deviatoric stress tensor with:
1) having a given deviatoric stress tensor in a principal stress frame (PSF);
2) computing an effective stiffness tensor (Cijkl) as a function of stress using a stress-induced stiffness model provides for an effective stiffness tensor (Cijkl) in the PSF frame;
3) rotating the effective stiffness tensor (Cijkl) in the PSF frame in a north-east vertical frame (NEV) in combination with: A) incorporating results from an elastic wave propagation theory; and B) incorporating P- and S-wave velocities and polarization directions derived from an arbitrary wave propagation; and
4) computing the FSA from a polarization direction of a fastest shear wave.

32. The apparatus of claim 31, wherein further including replacing the stress-induced stiffness model with a stress-induced stiffness rock physics model.

33. The apparatus of claim 25, wherein sonic anisotropy data includes borehole sonic logs.

34. The apparatus of claim 25, wherein image data includes one of borehole ultrasonic logs, resistivity image logs, borehole ultrasonic logs and resistivity image logs, or some combination thereof.

35. A method for estimating deviatoric stress tensor from borehole sonic log shear anisotropy directions and image log failure directions, the method comprising the steps of:
 a) acquiring one of sonic anisotropy data, image data or both associated with one or more borehole wherein the one or more borehole is one of vertical, deviated or both;
 b) employing the sonic anisotropy data to estimate fast shear direction (FSA) so as to extract FSA observed data;
 c) computing the FSA from forward modeling, wherein the forward modeling utilizes a first deviatoric stress tensor to extract FSA predicted data, such that the first deviatoric stress tensor comprises of one or more deviatoric stress tensor;
 d) computing FSA misfit from the difference between the FSA observed data and the FSA predicted data to obtain a computed FSA misfit which relates to the first deviatoric stress tensor;
 1) if the computed FSA misfit is equal to or less than a first defined value, then store the computed FSA misfit and the first deviatoric stress tensor; 2) repeat steps (c) thru (d(1)) using another deviatoric stress tensor such that a different deviatoric stress tensor is used for each repeat, until one or more predefined deviatoric stress tensors have been applied in step (c), then after repeating steps (c) thru (d(1)), storing the computed FSA misfit of step (d(1)) along with storing the respective deviatoric stress tensor;
 e) optionally employing the image data to identify borehole failure type and orientation, wherein the image data includes one of borehole break direction (BOD), tensile fracture direction (TFD) or both so as to extract one of BOD observed data, TFD observed data, or both; 1) computing one of the BOD, TFD or both from forward modeling, wherein the forward modeling utilizes the first deviatoric stress tensor to extract one of BOD predicted data, TFD predicted data or both; a. computing BOD misfit from the difference between the BOD observed data and the BOD predicted data to obtain a computed BOD misfit which relates to the first deviatoric stress tensor; i. if the computed BOD misfit is equal to or less than a second defined value, then store the computed BOD misfit and the first deviatoric stress tensor ii. repeat steps (e(1)(a)) thru (e(1)(a)(i)) using another deviatoric stress tensor such that a different deviatoric stress tensor is used for each repeat, until one of all or multiple predefined deviatoric stress tensors have been applied while computing the BOD from forward modeling, then store the repeated computed BOD misfit along with storing the respective deviatoric stress tensor; b. computing TFD misfit from the difference between the TFD observed data and the TFD predicted data to obtain a computed TFD misfit which relates to the first deviatoric stress tensor; i. if the computed TFD misfit is equal to or less than a third defined value, then store the computed TFD misfit and the first deviatoric stress tensor; ii. repeat steps (e(1)(b)) thru (e(1)(b)(i)) using another deviatoric stress tensor such that a different deviatoric stress tensor is used for each repeat, until one of all or multiple predefined deviatoric stress tensors have been applied while computing the TFD from forward modeling, then store the repeated computed TFD misfit along with storing the respective deviatoric stress tensor;
 f) selecting the smallest stored computed misfit along with the respective deviatoric stress tensor from the group consisting of one of the computed FSA misfit, computed BOD misfit, computed TFD misfit or any combination thereof, so as to select a final estimated deviatoric stress tensor whereby the final estimated deviatoric stress tensor is used for reservoir activities.

36. The method of claim 35, wherein the deviatoric stress tensor includes principal stress directions and deviatoric stress shape factor R.

37. The method of claim 35, wherein further including in step (e(1)) replacing the first deviatoric stress tensor with:
 1) having a given deviatoric stress tensor in a principal stress frame (PSF), such that the given deviatoric stress tensor is transformed into a north-east vertical frame (NEV);
 2) transforming the given deviatoric stress tensor from the NEV frame to a top of the borehole frame (TOH) using previously stored borehole orientation data; and
 3) using analytical expressions for stresses at one or more borehole wall for an arbitrary orientation of the borehole (Kirsch-Fairhurst Stress Model), relative to a far-field in situ stress tensor provides computing a direction of BOD for any one of the one or more borehole orientation as an angle for which a tangential stress reaches a maximum value, whereby the TFD is provided by an angle for which the tangential stress reaches a minimum value.

38. The method of claim 37, wherein further including in step (3) replacing the Kirsch-Fairhurst Stress Model with at least one other stress model that provides for stresses at the borehole wall for an arbitrary orientation of the borehole relative to the far-field stress.

39. The method of claim 35, wherein further including in step (c) replacing the first deviatoric stress tensor with:
 1) having a given deviatoric stress tensor in a principal stress frame (PSF);
 2) computing an effective stiffness tensor (Cijkl) as a function of stress using a stress-induced stiffness model provides for an effective stiffness tensor (Cijkl) in the PSF frame;
 3) rotating the effective stiffness tensor (Cijkl) in the PSF frame in a north-east vertical frame (NEV) in combination with: A) incorporating results from an elastic wave propagation theory; and B) incorporating P- and S-wave velocities and polarization directions derived from an arbitrary wave propagation; and
 4) computing the FSA from a polarization direction of a fastest shear wave.

40. The method of claim 39, wherein further including in step (2) replacing the stress-induced stiffness model with a stress-induced stiffness rock physics model.

41. The method of claim 35, wherein sonic anisotropy data includes borehole sonic logs.

42. The method of claim 35, wherein image data includes one of borehole ultrasonic logs, resistivity image logs, borehole ultrasonic logs and resistivity image logs, or some combination thereof.

43. The method of claim 35, wherein the FSA data is combined with one of BOD, TFD or some combination thereof, so as to be combined into a single grid search algorithm.

44. The method of claim 35, wherein forward modeling is based on a mechanical model.

45. The method of claim 35, wherein further including in step (b) the employing of the sonic anisotropy data to estimate fast shear direction (FSA) is performed in stress-sensitive rock formations.

46. The method of claim 35, wherein the deviatoric stress tensor is further defined by stress direction and stresses regime factor Q.

47. The method of claim 34, wherein failure is further defined from the group consisting of: a borehole breakout, a borehole tensile fracture, a tensile fracture, a borehole drilling induced fracture, a drilling induced fracture, a borehole hydraulic fracture, a hydraulic fracture, a borehole shear fracture or a shear fracture.

48. A method for estimating stress characteristics of formations, the method comprising the steps of:
  a) acquiring one of sonic anisotropy data, image data or both associated with one or more borehole wherein the one or more borehole is one of vertical, deviated or both;
  b) employing the sonic anisotropy data to estimate fast shear direction (FSA) so as to extract FSA observed data;
  c) computing the FSA from forward modeling, wherein the forward modeling utilizes a first deviatoric stress tensor to extract FSA predicted data;
  d) computing FSA misfit from the difference between the FSA observed data and the FSA predicted data to obtain a computed FSA misfit that relates to the first deviatoric stress tensor;
  e) if the computed FSA misfit is equal to or less than a defined value, then store the computed FSA misfit, otherwise repeat steps cc) thru (d) thru (h) using another deviatoric stress tensor such that a different deviatoric stress tensor is used for each repeat, until one of all or multiple predefined deviatoric stress tensors have been applied in step (c); and
  f) selecting the smallest stored computed misfit from the group consisting of the stored computed FSA misfit, one or more other stored computed misfit or some combination thereof, to determine a final estimated deviatoric stress tensor whereby the final estimated deviatoric stress tensor is used for reservoir activities.

49. The method of claim 48, including the further step of storing with the computed FSA misfit of step (e), the first deviatoric stress tensor.

50. The method of claim 48, further comprising after repeating steps (c) thru (e), storing the computed FSA misfit of step (e) along with storing the respective deviatoric stress tensor.

51. The method of claim 50, including the further step of storing with the final estimated deviatoric stress of step (f), the respective deviatoric stress tensor.

52. The method of claim 48, wherein the one or more other stored computed misfit is one of a computed borehole break direction (BOD) misfit, a computed tensile fracture direction (TFD) misfit, or both.

53. The method of claim 52, wherein the computed BOD misfit and the computed TFD misfit are calculated by the steps of:
  i) employing the image data to identify borehole failure type and orientation, wherein the image data includes one of the BOD, the TFD or both so as to extract one of a BOD observed data, a TFD observed data, or both;
  j) computing one of the BOD, the TFD or both from forward modeling, wherein the forward modeling utilizes the first deviatoric stress tensor to extract one of a BOD predicted data, a TFD predicted data or both;
  k) computing the BOD misfit from the difference between the BOD observed data and the BOD predicted data to obtain a computed BOD misfit which relates to the first deviatoric stress tensor;
  l) if the computed BOD misfit is equal to or less than a second defined value, then store the computed BOD misfit and the first deviatoric stress tensor;
  m) repeat steps (b) thru (c) using another deviatoric stress tensor such that a different deviatoric stress tensor is used for each repeat, until one or more predefined deviatoric stress tensors have been applied in step (b), then after repeating steps (b) thru (d), storing the computed BOD misfit of step (d) along with storing the respective deviatoric stress tensor;
  n) computing TFD misfit from the difference between the TFD observed data and the TFD predicted data to obtain the computed TFD misfit which relates to the first deviatoric stress tensor; and
  o) if the computed TFD misfit is equal to or less than a third defined value, then store the computed TFD misfit and the first deviatoric stress tensor;
  p) repeat steps (d) thru (e) using another deviatoric stress tensor such that a different deviatoric stress tensor is used for each repeat, until one of all or multiple predefined deviatoric stress tensors have been applied in step (b), then after repeating steps (b) and (f), storing the computed FSA misfit of step (f) along with storing the respective deviatoric stress tensor.

* * * * *